United States Patent
Aston

(10) Patent No.: US 8,660,935 B2
(45) Date of Patent: Feb. 25, 2014

(54) COMPUTER-IMPLEMENTED SYSTEMS AND METHODS FOR CALCULATING ESTIMATED TRANSACTION COSTS FOR TRANSACTIONS INVOLVING TRADABLE FINANCIAL PRODUCTS

(75) Inventor: Paul Aston, New York, NY (US)

(73) Assignee: Morgan Stanley, New York, NY (US)

( * ) Notice: Subject to any disclaimer, the term of this patent is extended or adjusted under 35 U.S.C. 154(b) by 532 days.

(21) Appl. No.: 12/904,442

(22) Filed: Oct. 14, 2010

(65) Prior Publication Data

US 2012/0095896 A1   Apr. 19, 2012

(51) Int. Cl.
*G06Q 40/00* (2012.01)

(52) U.S. Cl.
USPC ............. 705/37; 705/7.37; 705/26.8; 705/35; 705/36 R; 705/400

(58) Field of Classification Search
None
See application file for complete search history.

(56) References Cited

U.S. PATENT DOCUMENTS

| | | | |
|---|---|---|---|
| 7,110,974 B1 * | 9/2006 | Rust | 705/37 |
| 7,353,212 B1 * | 4/2008 | Darcy et al. | 705/400 |
| 7,831,495 B1 * | 11/2010 | Wester | 705/36 R |
| 7,941,360 B2 * | 5/2011 | Zhang et al. | 705/37 |
| 2002/0069103 A1 * | 6/2002 | Puri et al. | 705/11 |
| 2003/0130916 A1 * | 7/2003 | Block et al. | 705/35 |
| 2003/0225660 A1 * | 12/2003 | Noser et al. | 705/36 |
| 2003/0233306 A1 * | 12/2003 | Madhavan et al. | 705/37 |
| 2004/0215549 A1 * | 10/2004 | Madhavan et al. | 705/37 |
| 2005/0102218 A1 * | 5/2005 | Sargent et al. | 705/37 |
| 2005/0171887 A1 * | 8/2005 | Daley et al. | 705/37 |
| 2005/0228731 A1 * | 10/2005 | Coates | 705/35 |
| 2005/0246260 A1 * | 11/2005 | Hodgdon et al. | 705/36 |
| 2006/0074762 A1 * | 4/2006 | Heising et al. | 705/26 |
| 2008/0109288 A1 * | 5/2008 | Borkovec et al. | 705/7 |
| 2008/0208769 A1 * | 8/2008 | Beer et al. | 705/36 R |
| 2008/0222052 A1 * | 9/2008 | Choueifaty | 705/36 R |
| 2008/0249924 A1 * | 10/2008 | Chiulli et al. | 705/37 |

(Continued)

FOREIGN PATENT DOCUMENTS

WO    WO 03071397    * 8/2003

OTHER PUBLICATIONS

Brandes, Yosi. Transaction Costs and Equity Portfolio Capacity Analysis. Investment Technology Group. Aug. 2009.*

(Continued)

*Primary Examiner* — Robert Niquette
(74) *Attorney, Agent, or Firm* — K&L Gates LLP

(57) ABSTRACT

Computer-implemented systems and methods for computing a transaction cost metric for a transaction (or trade order) involving a tradable financial product, such as a FX currency pair. The transaction cost metric can be computed pre-trade and compared to a quoted price for the trade from a dealer to evaluate the quoted price. The computed transaction cost metric, which is based on a slippage premium for the trade order, is based on at least a notional size for the trade order. The slippage premium represents a difference between an effective price at which the trade order is filled and a price for the financial product at inception of the trade order. The transaction cost metric may be computed as an average of a strip of options, where the values of the options are computed using an option pricing formula. The strip of options may comprise one or more options, each with different tenors, where the tenors correspond to the expected time periods for orders to arrive to fill the trade order.

27 Claims, 18 Drawing Sheets

(56) References Cited

U.S. PATENT DOCUMENTS

| | | | |
|---|---|---|---|
| 2009/0006231 A1* | 1/2009 | Zhang et al. | 705/35 |
| 2010/0121755 A1* | 5/2010 | Spurgin et al. | 705/37 |
| 2010/0268664 A1* | 10/2010 | Borkovec et al. | 705/36 R |
| 2011/0196773 A1* | 8/2011 | Fatica et al. | 705/37 |

OTHER PUBLICATIONS

RBS FIX, "Execute with transparency and confidence", RBSMarketplace, The Royal Bank of Scotland, Aug. 2010, 2 pages.

Avellaneda, Marco and Sasha Stoikov, "High-frequency trading in a limit order book", *Quantitative Finance*, vol. 8, No. 3, Apr. 2008, pp. 217-224.

Guéant, et al., "Dealing with the Inventory Risk, A solution to the market making problem", Paris, France, Europlace Institute of Finance, Mar. 2012, pp. 1-32.

AES® FX, Guiding You in FX, Credit Suisse Group AG, Mar. 2010, 2 pages.

Lin, Victor, "Trading Strategy, Cost Efficiencies in FX Algo Trading", Market Commentary, Portfolio Strategy, Credit Suisse, AES®, Apr. 22, 2010, 9 pages.

Lin, Victor, "Trading Strategy, Getting Sophisticated", Market Commentary, Portfolio Strategy, Credit Suisse, AES®, Oct. 28, 2010, 8 pages.

* cited by examiner

COMPUTER-IMPLEMENTED SYSTEMS AND METHODS FOR CALCULATING ESTIMATED TRANSACTION COSTS FOR TRANSACTIONS INVOLVING TRADABLE FINANCIAL PRODUCTS

CROSS-REFERENCE TO RELATED APPLICATIONS

This application incorporates by reference in its entirety the concurrently filed application by Paul Aston, entitled COMPUTER-IMPLEMENTED SYSTEMS AND METHODS FOR DETERMINING LIQUIDITY CYCLE FOR TRADABLE FINANCIAL PRODUCTS AND FOR DETERMINING FLOW-WEIGHTED AVERAGE PRICING FOR SAME," Ser. No. 12/904,436.

BACKGROUND

Financial markets are inherently volatile, characterized by shifting values, risks and opportunities. The prices of individual financial products are frequently changing for numerous reasons, including shifts in perceived value, localized supply/demand imbalances, and price changes in other sector investments or the market as a whole. Reduced liquidity adds price volatility and market risk to any contemplated transaction, and in the face of this volatility, Transaction Cost Analysis (TCA) has become increasingly important to help firms measure how effectively both perceived and actual portfolio orders are completed.

Several well-conceived TCA frameworks have evolved, but mostly for equities (e.g., stocks). These equity TCA frameworks rely on the market liquidity information that is available from equity exchanges. For financial products where market liquidity information is not readily observable, such as currency, there are few if any TCA solutions.

Currencies are not like exchange-traded assets. The currency market is fragmented, highly decentralized, and trades over-the-counter (OTC). This means there is no single institution that serves as point for liquidity aggregation and information dissemination. Instead, the market basically operates as a quasi-centralized network of dealers that includes major banks, broker-dealers and electronic communications networks (ECNs). In the currency market, dealers tend to manage their own order flows and closely guard them as proprietary information. Since most transactions in global foreign exchange are executed as private bilateral agreements, the terms of these agreements (i.e., transacted price and volume) are rarely revealed to other market participants. The result is a market rife with informational asymmetries, where liquidity is largely hidden from view.

SUMMARY

In one general aspect, the present invention is directed to computer-implemented systems and methods for computing a transaction cost metric for a transaction (or trade order) involving a tradable financial product, such as a FX currency pair. The transaction cost metric, which is related to what is herein referred to as the "slippage premium," can be computed pre-trade and compared to a quoted price for the trade order from a dealer to evaluate the quoted price. The computed transaction cost metric is based on at least a notional size for the trade order and represents a difference between an effective price at which the trade order is filled by future arriving complimentary orders (offers for a bid and vice versa) and a price for the financial product at inception of the trade order. The transaction cost metric may be computed as an average of computed values for a strip of options, where the values of the options are computed using an option pricing formula. The strip of options may comprise one or more options, each with a different tenor, where the tenors correspond to the expected time periods for complimentary orders to arrive to fill the trade order.

These and other advantages of the present invention will be apparent from the description below.

FIGURES

Various embodiments of the present invention are described herein below in conjunction with the following figures, wherein.

Figure 8:
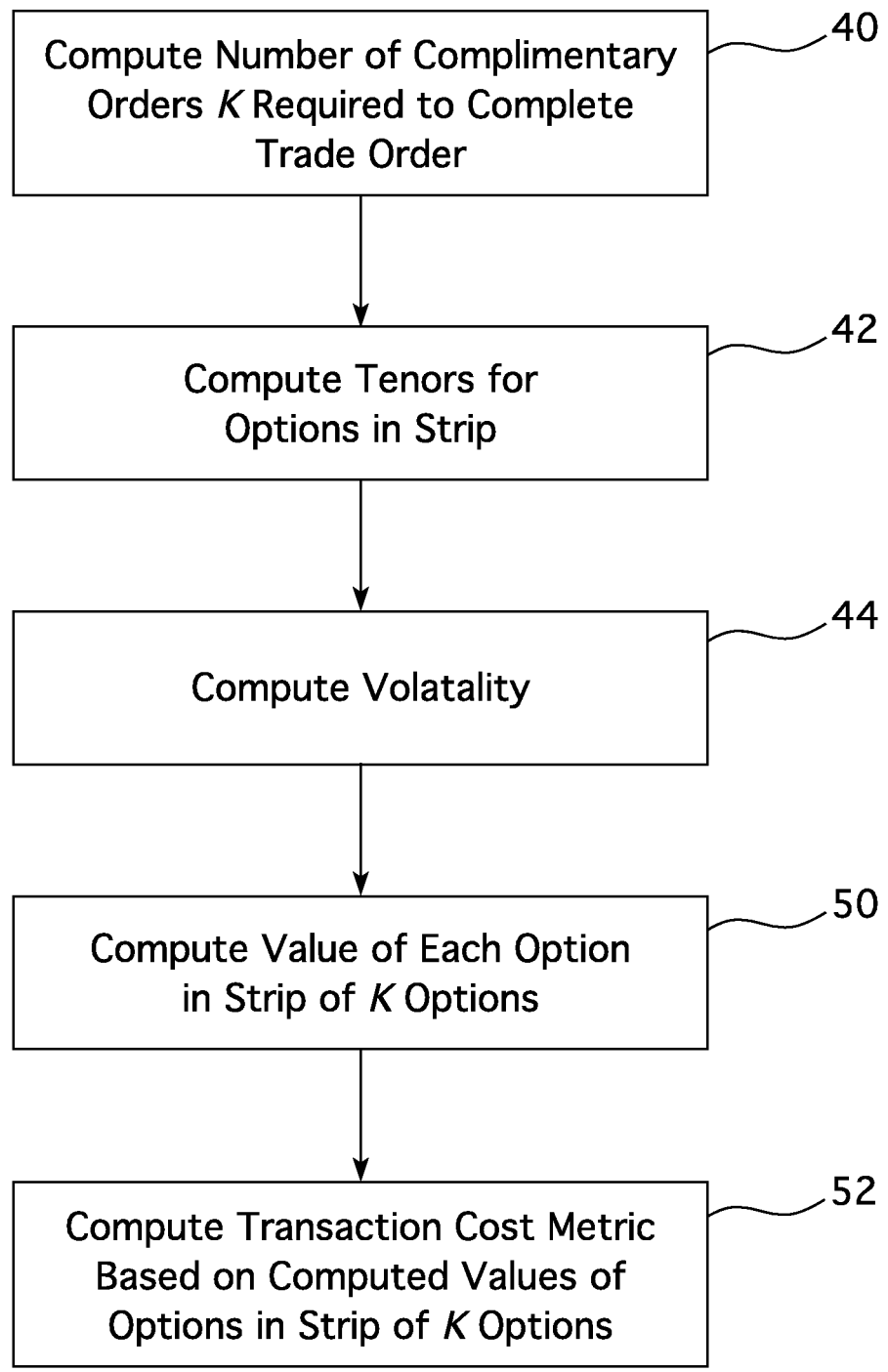
Figure 9A:
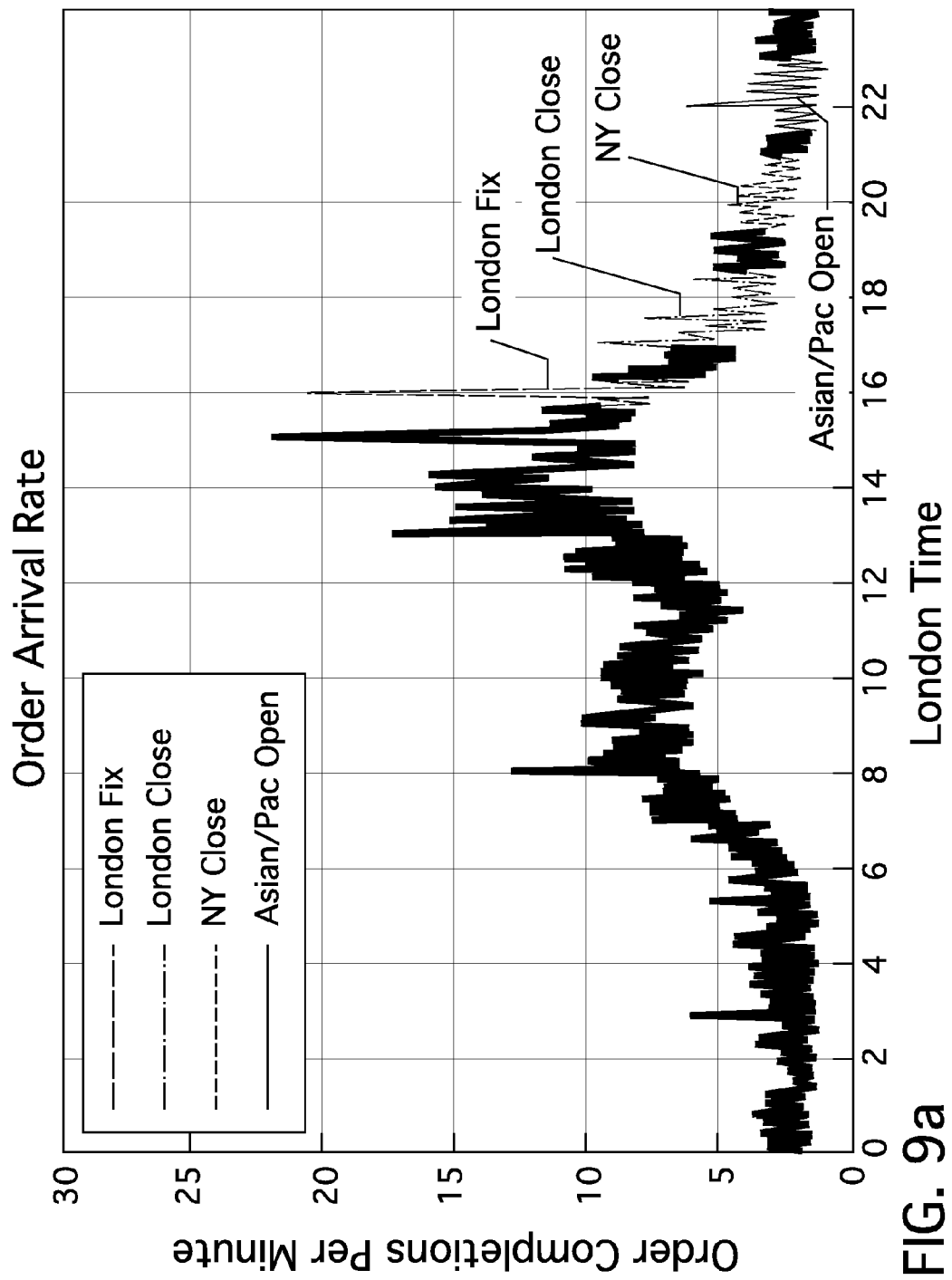
Figure 9B:
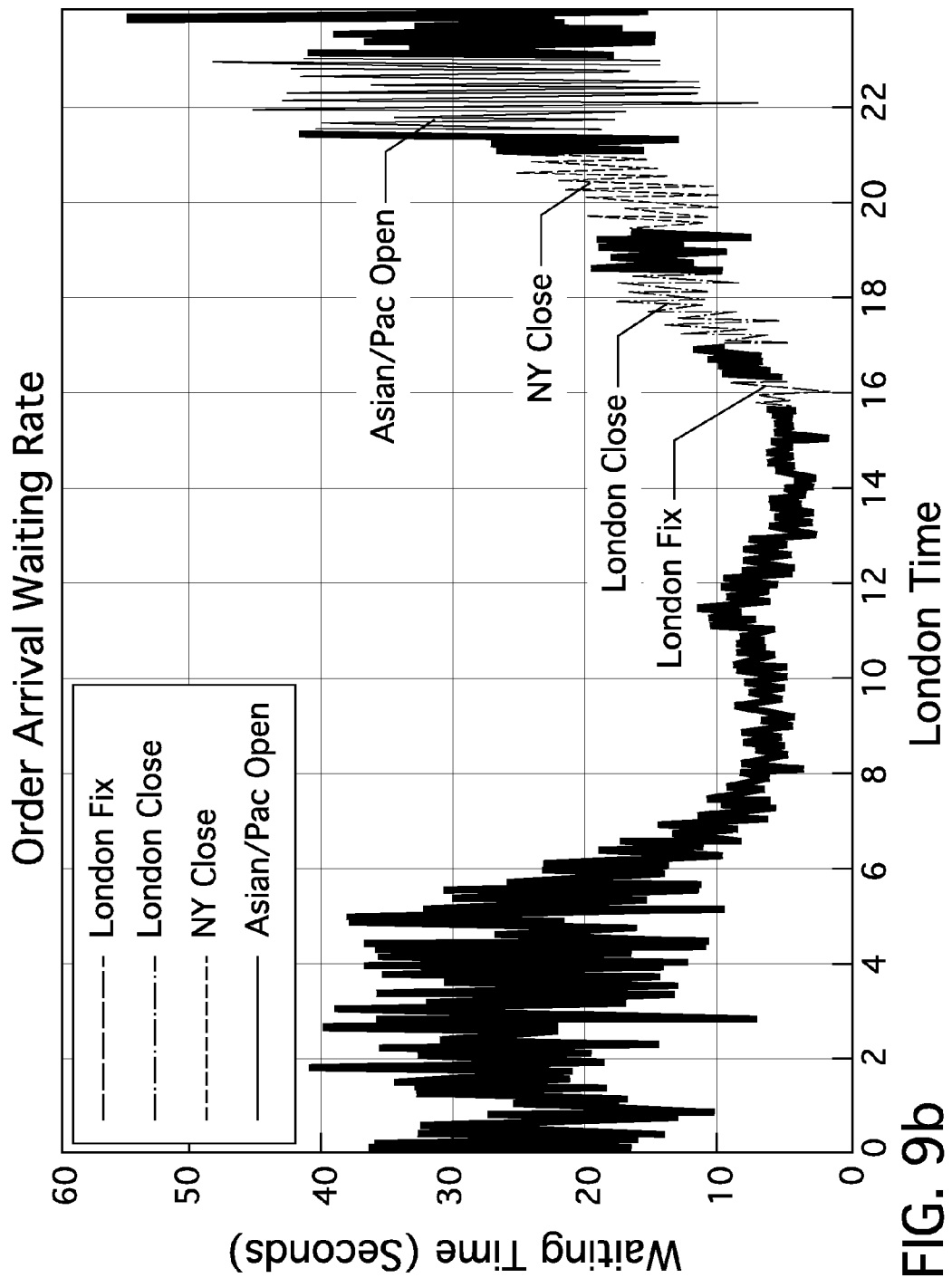
Figure 9C:
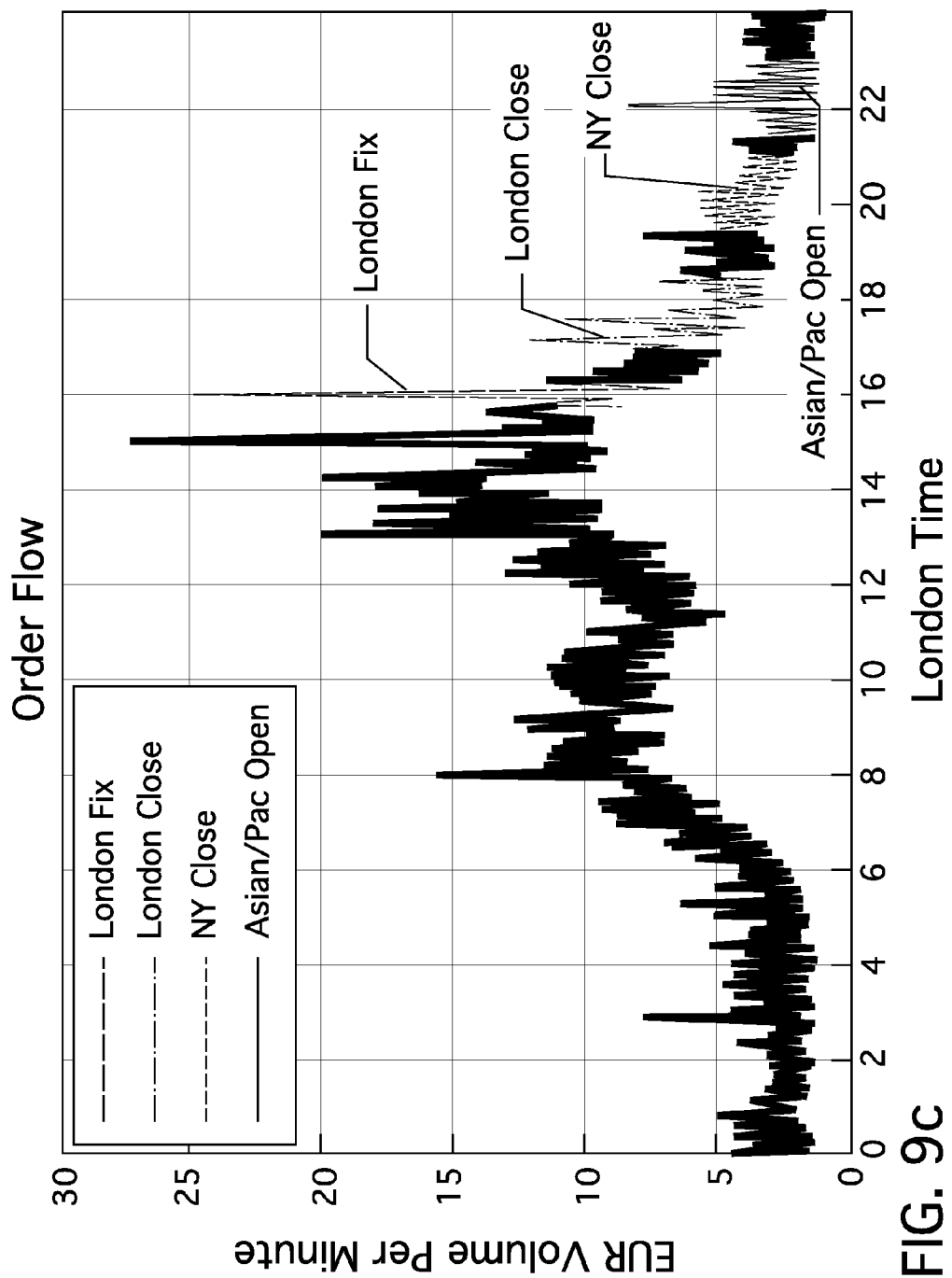
Figure 9D:
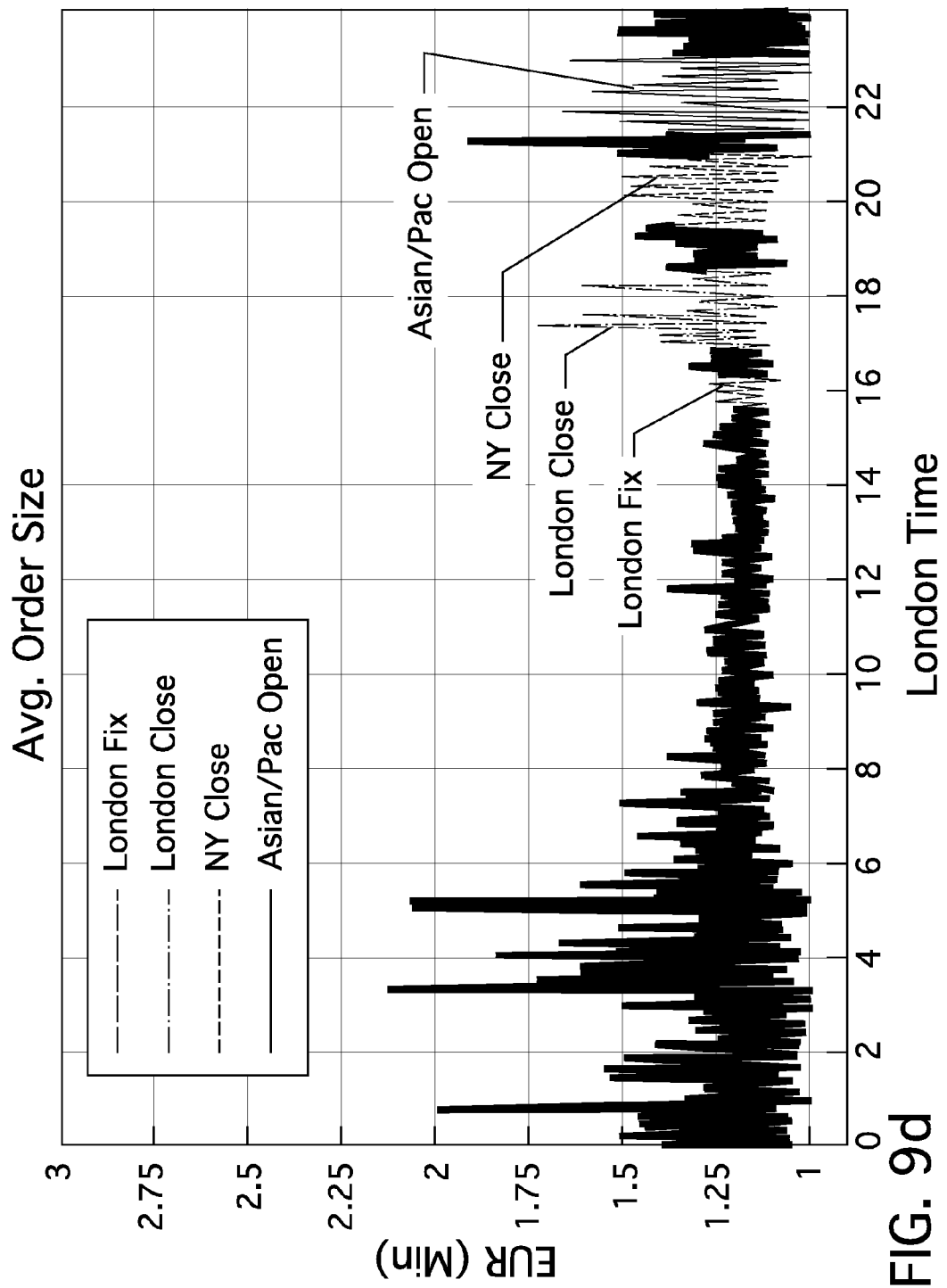
Figure 10A:
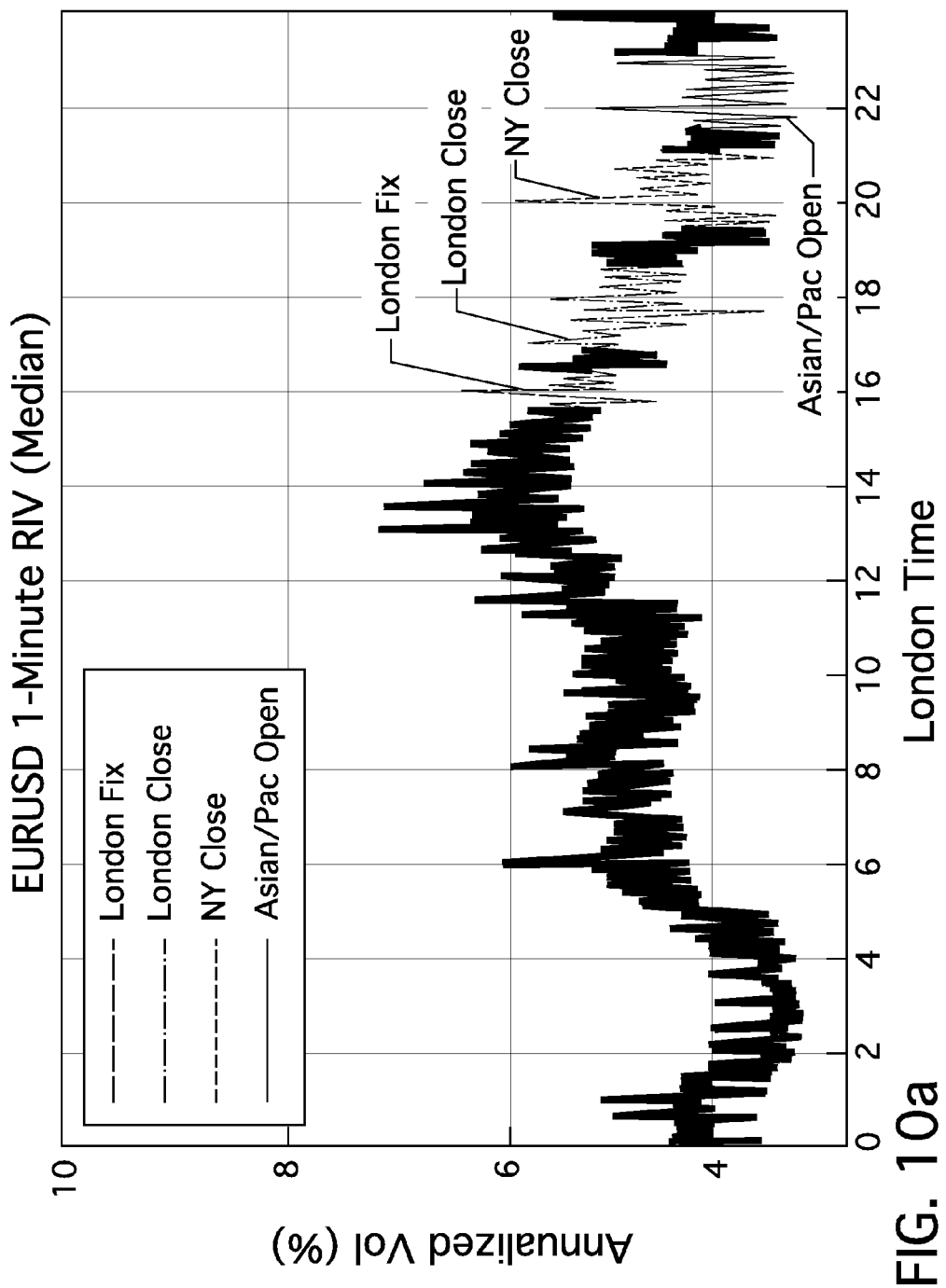
Figure 10B:
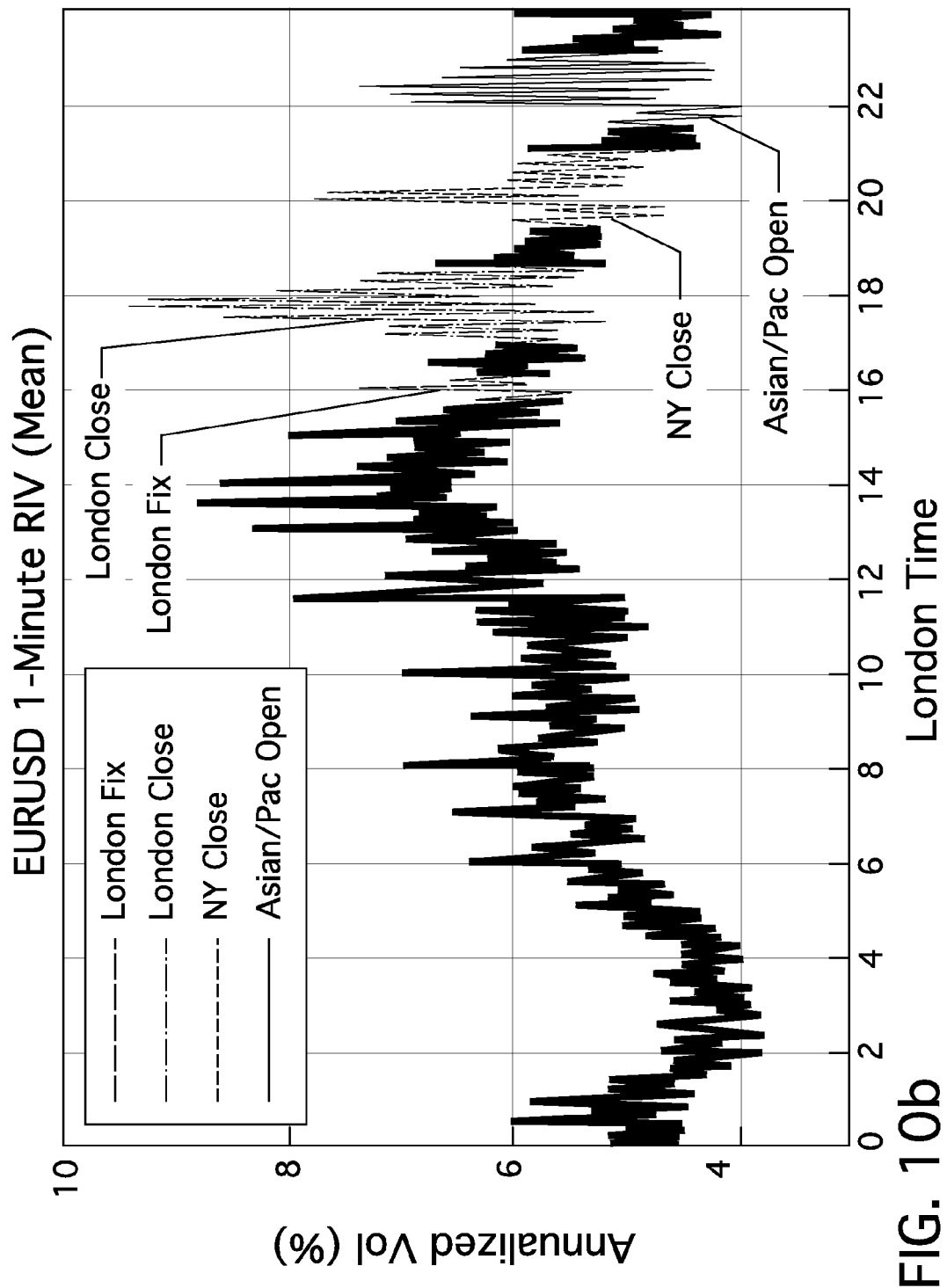
Figure 10C:
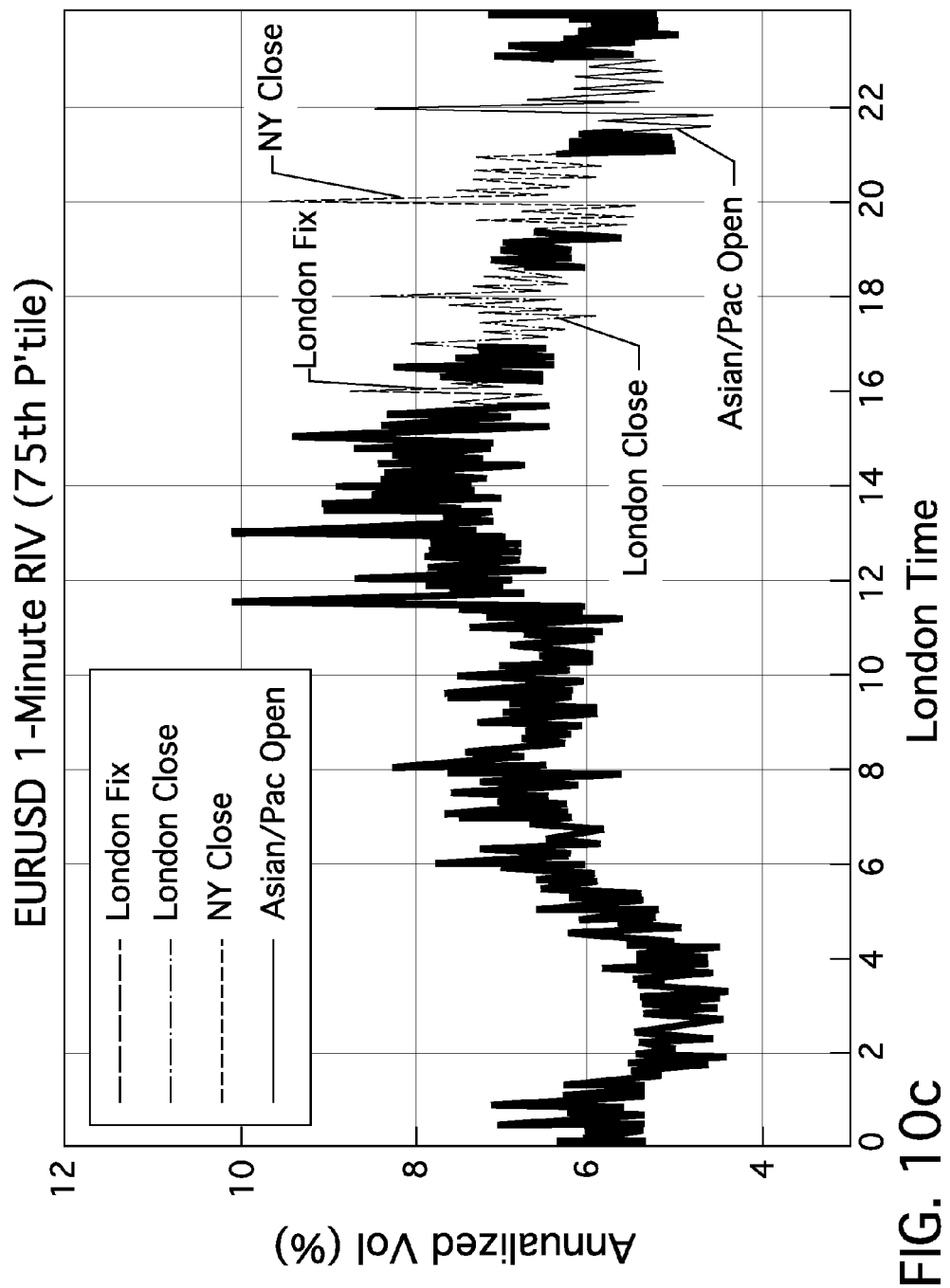
Figure 10D:
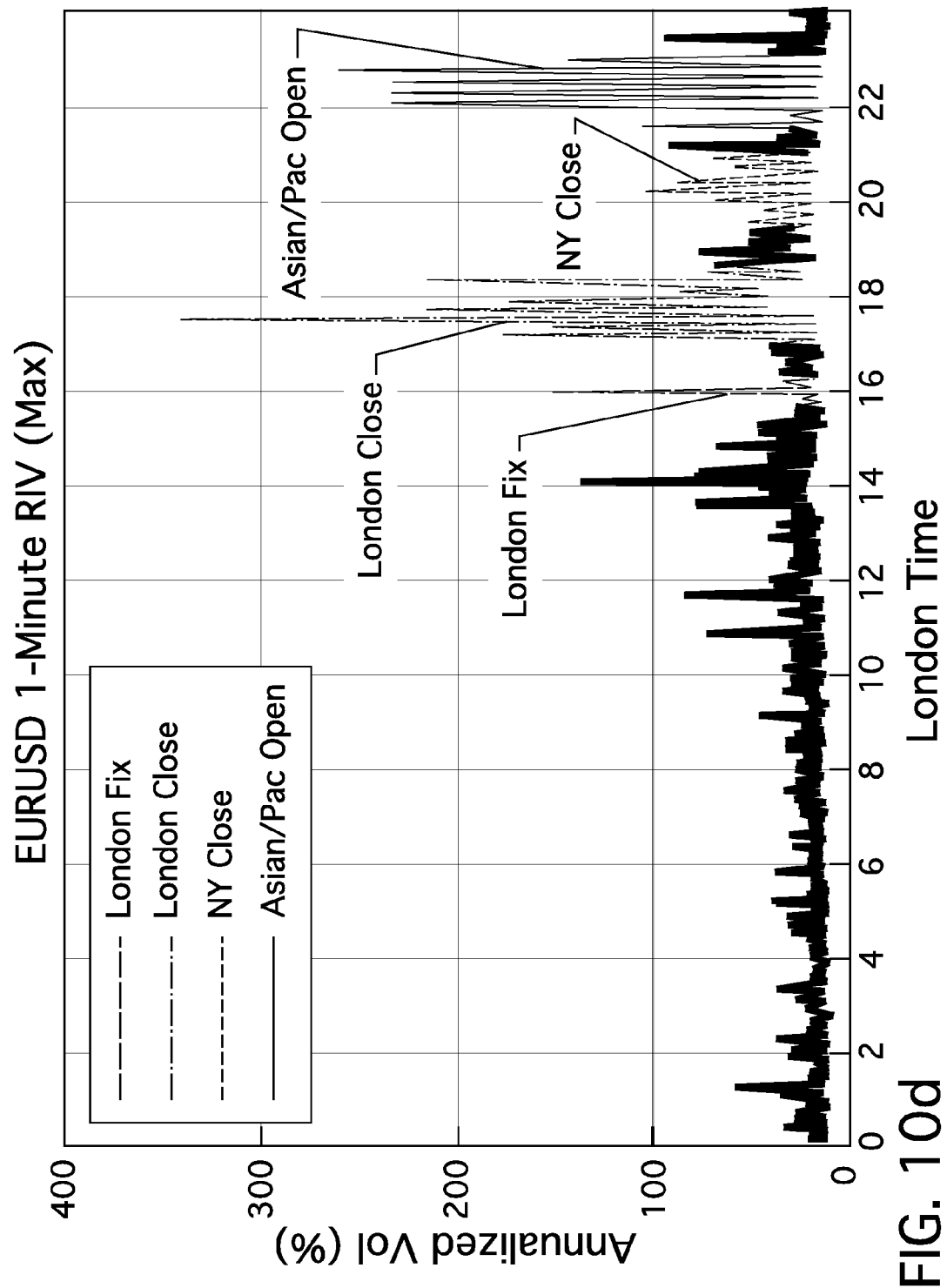

FIG. 7$a$-$d$ are graphs showing exemplary potential costs as a function of order arrival waiting times for different levels of market volatility FIG. 8 is a flowchart showing a process for computing estimated transaction costs for a transaction involving a tradable financial product according to various embodiments of the present invention;

FIGS. 9$a$-$d$ are graphs showing the average rate of order arrivals, order arrival waiting times, order flow, and order size throughout the London day on the EBS dealing platform;

FIG. 10$a$-$d$ show statistics for RIV levels observed in 2009 for EURUSD between Jan. 1 and Jul. 21, 2009

Figure 11:
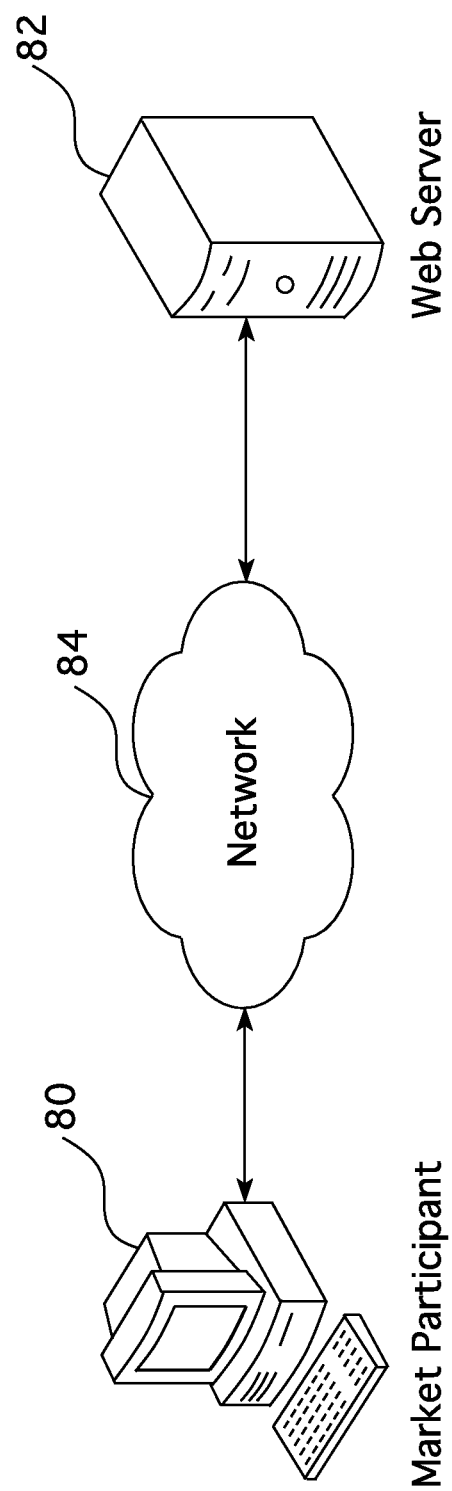
Figure 12:
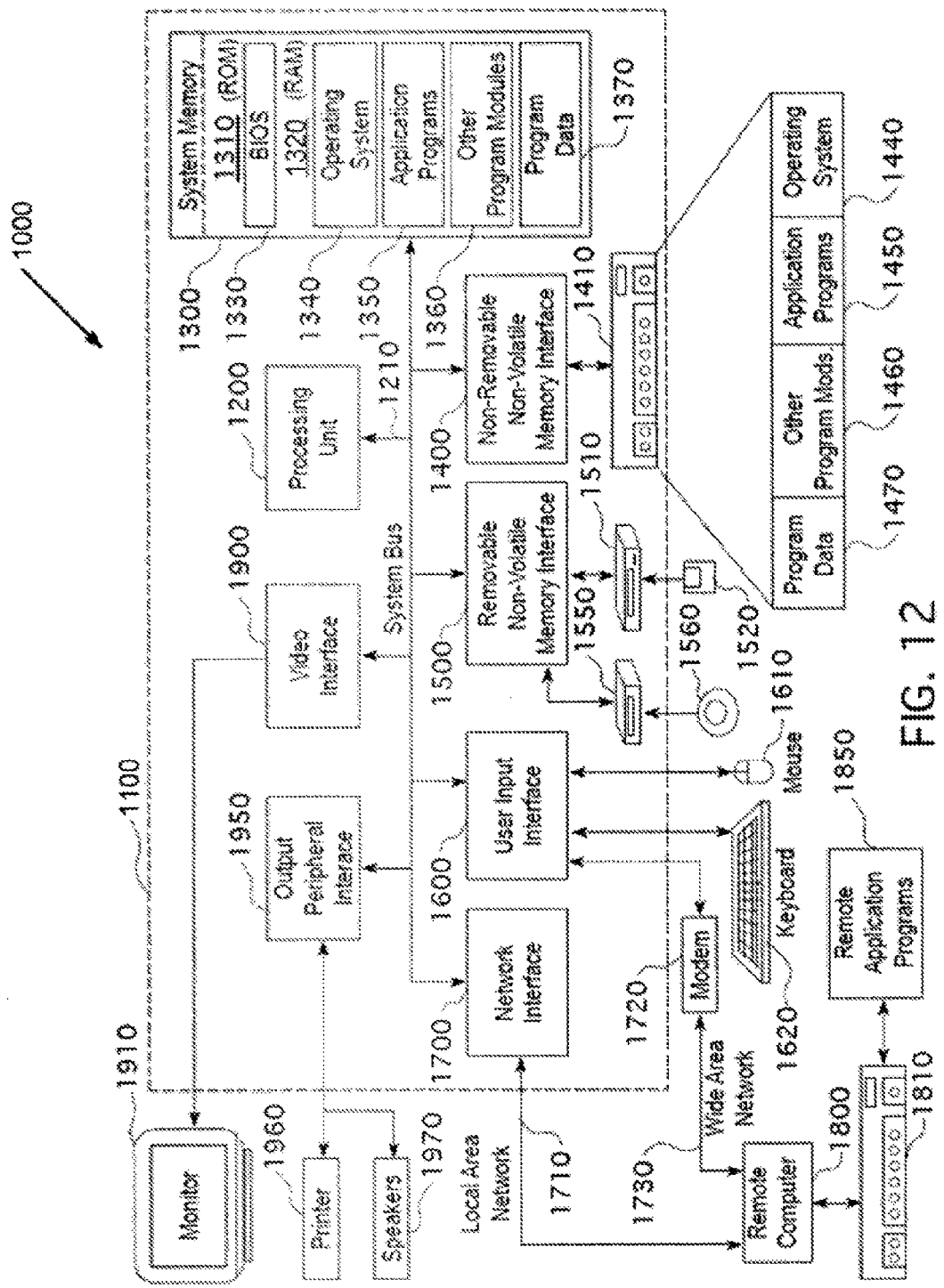

FIG. 11 is a diagram of a computer network for a web-based transaction cost calculator according to various embodiments of the present invention;

FIG. 12 is a diagram of a computing environment according to various embodiments of the present invention.

DESCRIPTION

Various non-limiting embodiments of the present disclosure will now be described to provide an overall understanding of the principles of the structure, function, manufacture, and use of the systems and methods described herein for transaction costs analysis for trades involving a tradable financial product. In the description to follow, the tradable financial products are generally foreign currency exchange (FX) pairs (such as Euro-U.S. Dollar (sometimes denominated "EURUSD")) used in spot trading of foreign currency, although the present invention is not so limited and it should be recognized that the systems and methods of the present invention could be used for other types of tradable financial products, such as equities (e.g., stock), debt (e.g., bonds), and derivative contracts (futures, options, commodities, etc.). One or more examples of these non-limiting embodiments are illustrated in the accompanying drawings. It will be appreciated that the systems and methods specifically described herein and illustrated in the accompanying drawings are non-limiting example embodiments and that the scope of the various non-limiting embodiments of the present disclosure are defined solely by the claims. The features illustrated or described in connection with one non-limiting embodiment can be combined with the features of other non-limiting embodiments. Such modifications and variations are intended to be included within the scope of the present disclosure.

FX products are typically expressed in pairs, with a left-hand currency and a right-hand currency, such as EURUSD (Euro—U.S. Dollar), USDJPY (U.S. Dollar—Japanese Yen), GBPUSD (Great Britain Pound—U.S. Dollar), USDCHF (U.S. Dollar—Swiss Franc), and many others. A FX market participant can buy the left-hand currency by selling the right-hand currency and vice versa. The spot markets for FX products are typically over-the-counter (OTC) markets and some spot FX dealing platforms presently exist, such as the EBS and Reuters. A trader receiving an order from a customer/FX market participant may place the customer's order with one of the dealing platforms or some other FX market for execution.

One of the basic goals of TCA is to model market impact, or the extent to which a particular sized transaction might move price against the buyer or seller. Typically, to gain an empirical sense of the relationship between order size and market impact, TCA models have focused mostly on ex-post statistical analyses of observed bid-offer spreads and/or cross-dealer pricing surveys. For the most part, these techniques have been successful when analyzing exchange-traded assets since the critical information needed to conduct TCA (i.e., transacted price and volume) is readily available from the exchange. However, this information is rarely available in the OTC currency markets and, as a result, currency TCA techniques need to go beyond traditional approaches. One approach is to tackle the problem from first principles using a microstructure model of dealer price setting behavior. Dealer price setting behavior relates directly to the inventory problem of procuring liquidity and managing order flows under risk aversion. The description below describes this model in detail and demonstrates how the model yields, in various embodiments, the seminal Black-Scholes (B-S) options pricing formula as a succinct way to explain transaction costs and the dynamics of market impact.

One of the fundamental challenges a dealer faces when making a market in FX is the ability to quote competitive prices while managing asynchronous order flows on a continuing basis. This type of market environment is known as a continuous double auction (CDA). Since it is unlikely that mutually compatible buy and sell orders will arrive at exactly the same instant in time, dealers must have a way to warehouse positions in inventory until complimentary orders arrive. To accomplish this many dealers and dealing platforms employ a limit-order book and a set of trade-order priority rules.

A limit order book may be embodied as a database to record order inventory. Order inventory can include (i) limit-orders, which are interests to buy or sell a financial product (e.g., a FX currently pair) at a specified price, (ii) market-orders, which are interests to buy or sell the financial product at the best available price; and (iii) active risk positions, which occur when a dealer procures liquidity from their own balance sheet at a specified price. The act of procuring liquidity for a customer against the dealer's own balance sheet constitutes a form of leveraged lending known as endogenous liquidity. Trade-order priority rules define how to process newly arriving order flows with orders and positions already standing in inventory. Trade-order priority rules typically ensure that all orders execute at the best prices available on the limit order book.

Figure 2:
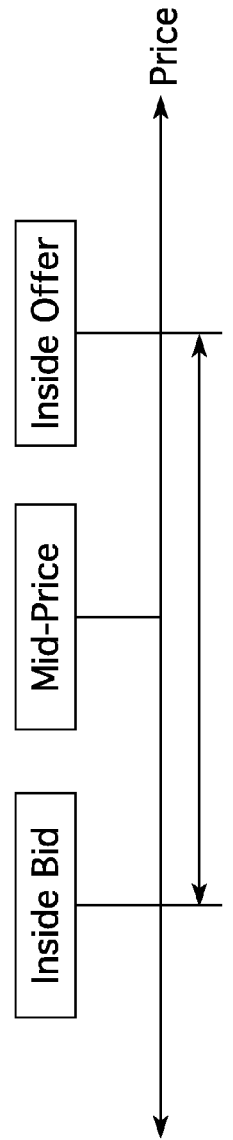
FIG. 2 is a diagram illustrating a bid-offer spread.
Figure 3:
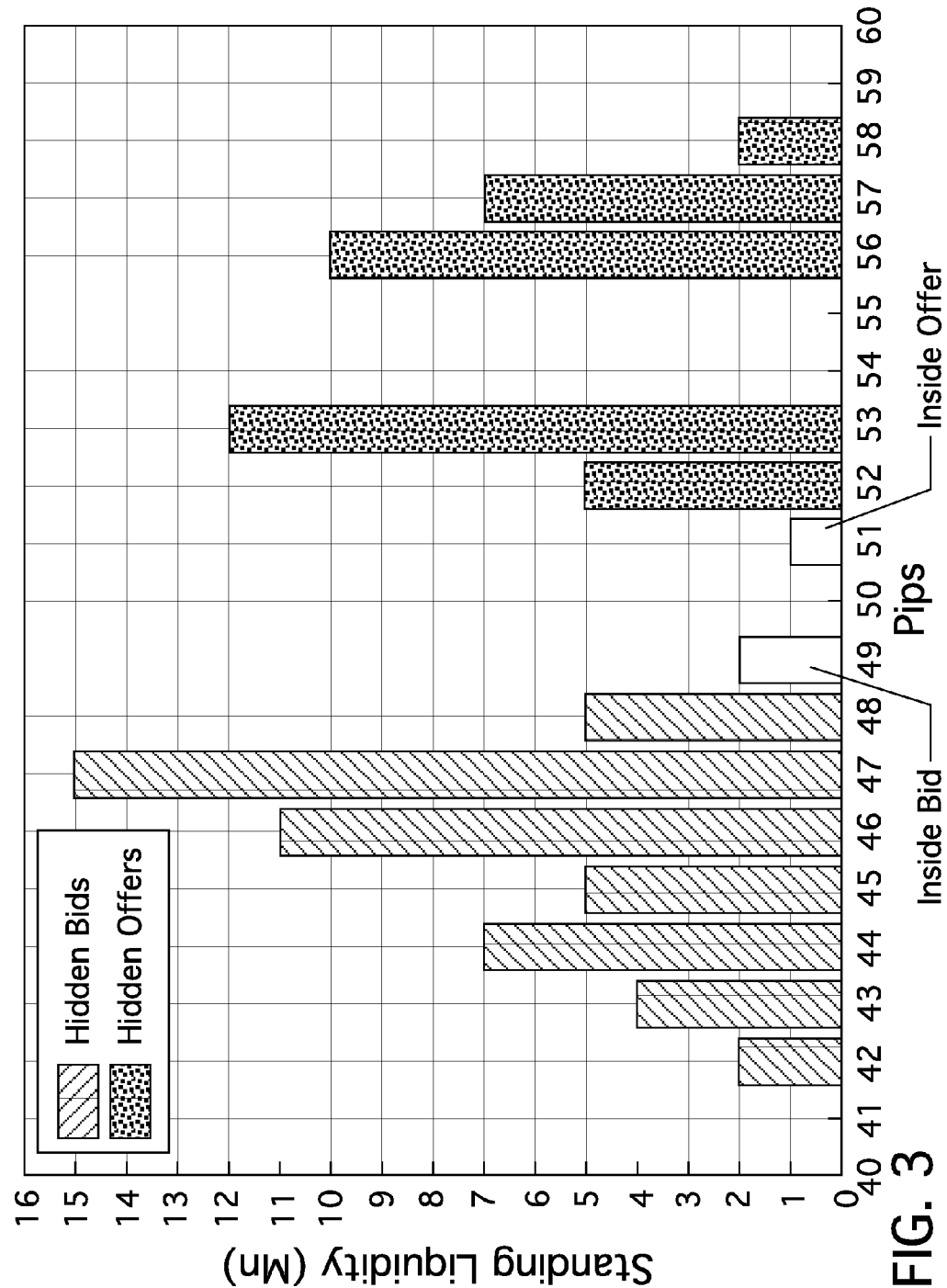
FIG. 3 is a graph showing a hypothetical limit-order book configuration.

The most common way to prioritize standing orders for execution is to rank them by price on a first-in/first out basis. When orders are ranked in this fashion, the bid-offer inventory on a dealer's limit-order book will tend to look like a pair of histograms. FIG. 3 illustrates a hypothetical limit order book. Here, the x-axis measures prices in "pips" and the y-axis shows the amount of liquidity standing at each price in millions. In currency markets, the convention is to quote pips ($1/100^{th}$ of a cent) around the currency's big figure price. Thus, if EURUSD is quoted as 1.4549/51, this indicates that the inside bid and offer prices are 1.4549 and 1.4551, respectively, and that the big figure price is 1.45. Standing bids are shown in FIG. 3 as the bids ranging from 42 to 49, and standing offers are shown in FIG. 3 as offers ranging from 51 to 58. The configuration of these histograms illustrates the distribution of standing liquidity across various prices on the limit-order book. Notice that the priority ranking of orders immediately reveals the inside (best) bid and offer quotes on the book. In this example the inside bid and offer stand at 49/51. Because the mid-price is defined as the median of the inside bid-offer, the mid-price is 50. The bid-offer spread, as shown in FIG. 2, is the difference between the prevailing inside offer and the prevailing inside bid for the product, with the mid-price at the mid-point between the inside offer and inside bid. The inside bid/offer tend to be the most competitive quotes that a dealer will show to the market. In fact, these are typically the only price indications a dealer will reveal to the market. Dealers rarely reveal information about inventory standing outside their inside quotes. This is why in FIG. 3 the outside liquidity on the limit-order book is shown with hatching. This represents the currency market's hidden liquidity. The hidden configuration of a dealer's limit-order book plays a structural role in the determination of transaction costs and the bid-offer spread.

The transaction cost identify function represents a dealer's breakeven profit & loss (P&L) equation. This function relates a dealer's quoted price, representative of a dealer's revenue in a transaction, to a dealer's underlying cost structure for procuring liquidity in a transaction. With loss of generality, a dealer's operational and balance sheet costs are ignored in this framework. One convenient way to look at this relationship is in terms of the visible and hidden costs of a currency transaction. A dealer's quoted price may be modeled as:

$$\text{Quoted Price} = \underbrace{\text{Mid Price} \pm .5 \times \text{Spread}}_{\text{Visible Cost}} \pm \underbrace{(w_L \times \text{Liquidity Premium} + w_S \times \text{Slippage Premium})}_{\text{Hidden Cost}} \quad (1)$$

This perspective relates a quoted price to the prevailing mid-price and the visible bid-offer spread. The spread, liquidity and slippage premia are added or subtracted when a dealer quotes an offer price or a bid price, respectively. The difference between the quoted price and the visible cost of the transaction is attributable to the hidden cost of the transaction, which one can view as the market impact component.

The hidden cost of a transaction can be decomposed further into a liquidity and a slippage premium. The micro-economic origin of these premia emanates from a basic inventory problem a dealer faces when procuring liquidity in a transaction. When a dealer receives an order, the dealer has two choices as to how to fill it: (1) the dealer can choose to fill the order out of standing inventory; or (2) the dealer can choose to wait and fill the order against newly arriving order flow. The liquidity premium reflects the cost of filling an order out of standing inventory, while the slippage premium represents the expected cost of filling an order against arriving order flow. Because a dealer can fill an order against both standing inventory and arriving order flow, the hidden cost of a currency transaction may represent a weighted average of the two. Hence, in the transaction cost identify function $w_L+w_S=1$, with both $1 \geq w_L \geq 0$ and $1 \geq w_S \geq 0$.

The particular form of the transaction cost identify function expressed by Equation (1) assumes that all dealers base quoted prices off the same visible cost; the mid price and visible bid-offer spread. If currencies traded on a centralized exchange, this would be a valid assumption since most exchanges employ a single, official limit-order book. However, the currency market is a decentralized, over-the-counter (OTC) market where dealers manage their own limit-order books on a proprietary basis.

An alternative way to look at a dealer's P&L equation is to relate a dealer's quoted price to their own proprietary cost structure.

$$\text{Quoted Price}_{\textit{Offer}} = \text{Inside Bid} + w_L \times \text{Full Liquidity Premium} + w_S \times \text{Full Slippage Premium}$$

$$\text{Quoted Price}_{\textit{Bid}} = \text{Inside Offer} - w_L \times \text{Full Liquidity Premium} - w_S \times \text{Full Slippage Premium} \quad (2)$$

Here, the bid-offer spread subsumes completely into the liquidity and slippage premia.

$$\text{Full Liquidity Premium} = \text{Liquidity Premium} + \text{Spread}$$

$$\text{Full Slippage Premium} = \text{Slippage Premium} + \text{Spread} \quad (3)$$

That rational behind this perspective is that if a dealer wants to offer liquidity, the dealer must acquire the inventory to do so by bidding for it on the open market. In a competitive market, a dealer will be reluctant to pay too much for inventory since this will erode profit margins if liquidity cannot be offered above a certain price. Hence, a dealer's inside bid can be viewed as the reservation price above which the dealer is unwilling to acquire inventory, given the dealer's ability to sell it at a particular price. This logic is reflexive in the sense that once a dealer acquires inventory at a particular cost, the dealer will be reluctant to sell it at a loss. Hence, a dealer's inside offer can be viewed as the reservation price below which the dealer is unwilling to dispose of inventory, given its underlying cost.

If the liquidity premium represents the cost of filling an order out of standing inventory and the slippage premium represents the expected cost of filling an order against arriving order flow, then the bid-offer spread may be endogenously determined by the configuration of a dealer's limit order book and the characteristics of the dealer's order flow. To see this more clearly, define the bid-offer spread in terms of Equation (2)

$$\text{Spread} = \text{Quoted Price}_{\textit{Offer}} - \text{Quoted Price}_{\textit{Bid}} \quad (4)$$

$$= \text{Inside Bid} - \text{Inside Offer} + 2 \times$$

$$(w_L \times \text{Full Liquidity Premium} + w_S \times \text{Full Slippage Premium})$$

Assuming that in a competitive market a dealer always quotes the dealer's inside bid-offer, Equation (4) yields:

$$\text{Spread} = w_L \times \text{Full Liquidity Premium} + w_S \times \text{Full Slippage Premium} \quad (5)$$

Plugging Equation (5) back into Equation (2) yields the identity $$\text{Inside Offer} = \text{Inside Bid} + \text{Spread} \quad (6)$$

Combining this result with the definition of the mid-price, $$\text{Mid Price} = (\text{Inside Bid} + \text{Inside Offer})/2 \quad (7)$$

shows that Equation (2) communicates exactly the same information as Equation (1); only the underlying frame of reference for pricing changes from the visible cost to the inside quotes, which represent a dealer's reservation prices. These results are now used to demonstrate that transaction costs can be directly related to the configuration of a dealer's limit-order book and the characteristics of order flow.

Figure 4:
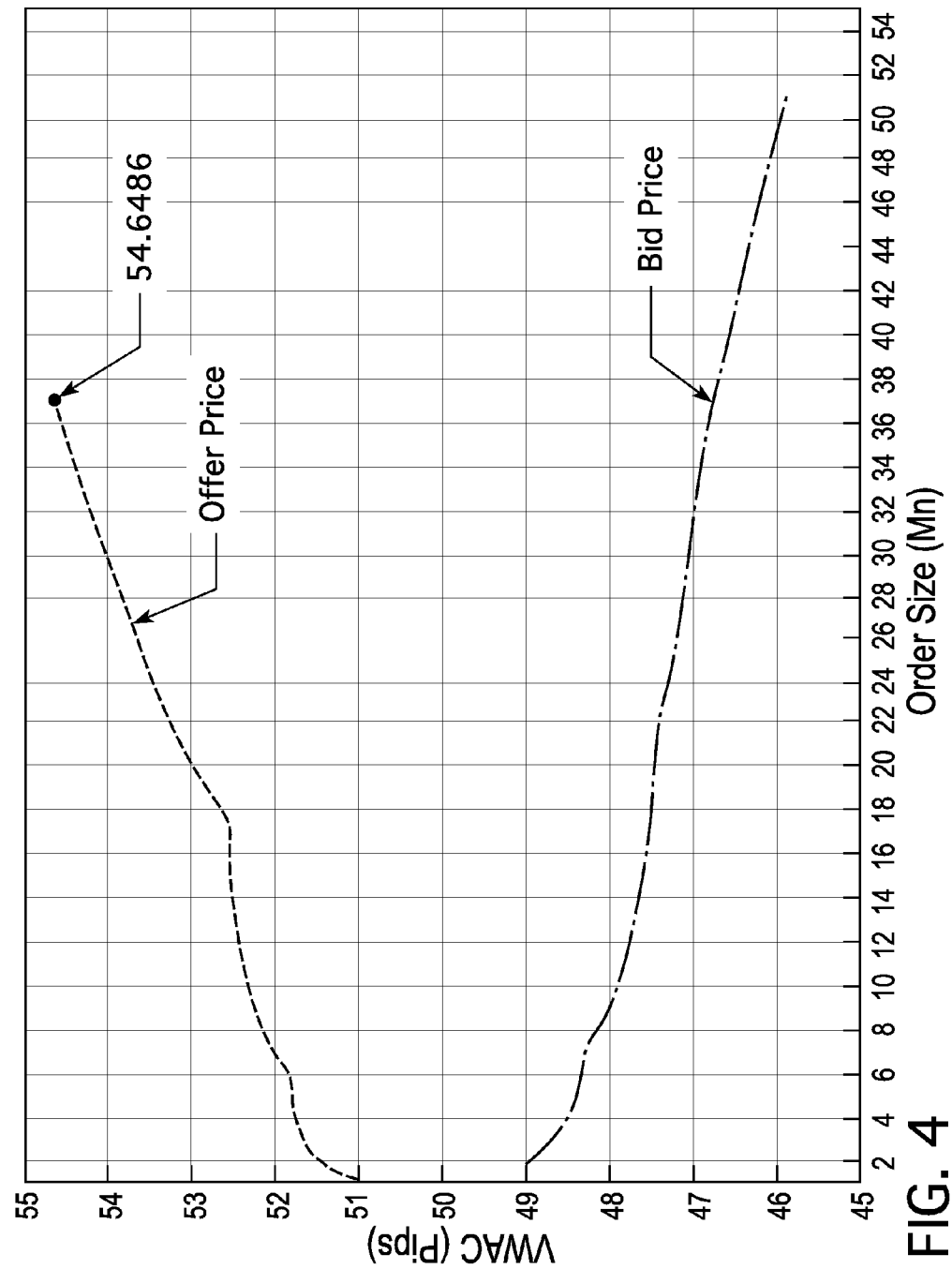
FIG. 4 is a graph showing the liquidity-impact function for the hypothetical limit-order book configuration shown in FIG. 3.

The relationship between order size and market impact can be traced by the liquidity-impact function, which measures the VWAC (volume weighted average cost) over the depth of the limit-order book in unit increments. The depth of a limit-order book's configuration is the cumulative sum of standing liquidity on either side of the book, counting from the inside quotes out. FIG. 4 illustrates the liquidity-impact function for the limit-order book depicted in FIG. 3. FIG. 4 shows how the VWAC of buy/sell orders may increase/decrease as a function of order size. For instance, in the example of FIG. 4, the VWAC of all 37 Mn standing offers (the cumulative standing offers from the example of FIG. 3) is 54.6486 pips; 3.6486 pips more than the visible cost of 51-offered. Since the VWAC provides an important basis for computing the dealer's breakeven P&L when filling an order against standing inventory, the liquidity impact function can be used to find the dealer's break even quote for a particular sized transaction. In terms of P&L, this can be written as:

$$P\&L = \pm(\text{Quoted Price} - VWAC) \quad (8)$$

where the $\pm$ symbol is $+$ when a dealer quotes an offer price (price to sell currency) and $-$ when a dealer quotes a bid price (price to buy currency), respectively. To compute the liquidity premium, the quoted price in Equation (8) can be replaced with the right-hand side of Equation (1), with P&L set to zero and terms rearranged to yield:

$$\text{Liquidity Premium} = \pm(VWAC - (\text{Mid Price} \pm 0.5 \times \text{Spread})) \quad (9)$$

Using the identities in Equations (6) and (7) yields:

$$\text{Liquidity Premium}_{\textit{Offer}} = \max\{VWAC - \text{Inside Offer}, 0\}$$

$$\text{Liquidity Premium}_{\textit{Bid}} = \max\{\text{Inside Bid} - VWAC, 0\} \quad (10)$$

where the max{ } argument appears because the liquidity premium must be non-negative. Inserting this last result into Equation (1) shows that when filling an order against standing inventory the quoted price is effectively equal to the VWAC of a dealer's standing inventory:

$$\text{Quoted Price}_{\textit{Offer}} = \text{Inside Offer} + \text{Liquidity Premium} = VWAC_{\textit{Standing Offers}}$$

$$\text{Quoted Price}_{\textit{Bid}} = \text{Inside Bid} - \text{Liquidity Premium} = VWAC_{\textit{Standing Bids}} \quad (11)$$

The slippage premium may represent the expected cost of filling an order against arriving complimentary order flow (e.g., arriving offers for a bid transaction and vice versa). In various embodiments, the slippage premium can be identified using the same intuition employed to identify the liquidity premium. However, in this case, because the prices of newly arriving orders tend to follow a random walk, the VWAC of inventory is stochastic. Thus, intuitively, when sourcing liquidity from arriving order flow, a dealer's quoted price should be consistent with the expected VWAC of the liquidity supplied.

Figure 5:
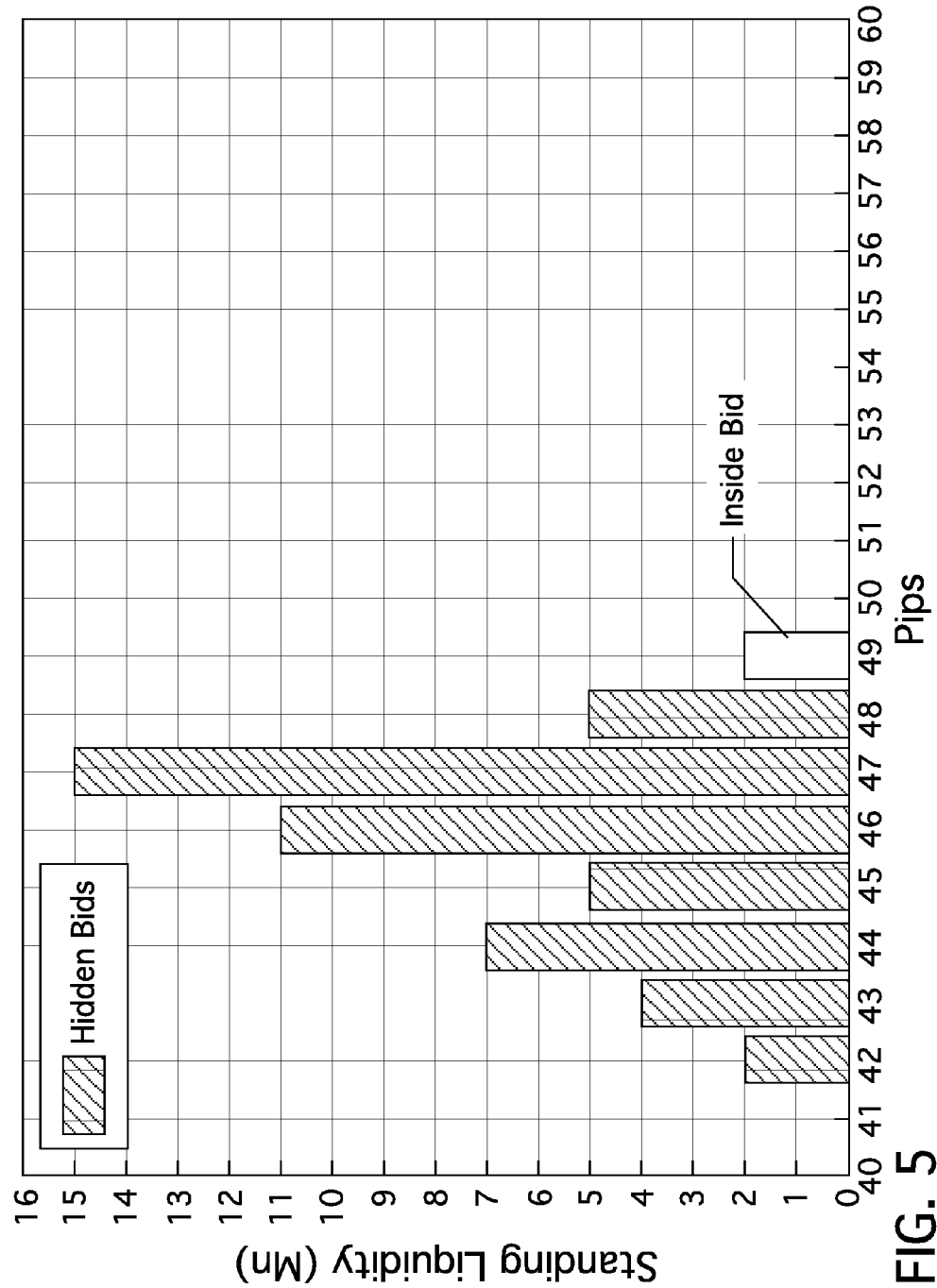
FIG. 5 is a graph showing the hypothetical limit-order book configuration of FIG. 3 with no offered inventory.

A dealer may decide to fill an order against arriving order flow for several reasons. One reason might be that the depth of available liquidity in standing inventory is insufficient to complete a particular sized transaction. Consider this scenario: a dealer receives a market-order to buy 100 Mn of a first currency (say EUR) selling a second currency (say USD). Given the configuration of the limit-order book depicted in the example of FIG. 3, only 37 Mn of standing offers are available. Because the market-bid exceeds the available liquidity of all standing offers on the limit-order book, the bid will sweep the book, cleaning all standing offers out of inventory. FIG. 5 depicts the situation. If the dealer quotes an up-front, firm price for the full 100 Mn, then technically the dealer filled the residual amount of 63 Mn against his or her own account at the quoted price. This effectively creates an active short position on the dealer's balance sheet and the dealer is at risk if prices drift above the quoted price. To cover the short, the dealer must buy currency in the open market. One way to achieve this is to wait for new offers to arrive on the limit-order book. Since the inside bid represents the dealer's reservation price when quoting an offer (Equation (2)), the dealer's perceived risk is having to acquire inventory at prices greater than the inside bid. This introduces two important factors into the dealer's price setting behavior: waiting time and price volatility.

Since orders arrive randomly, the dealer must wait for sufficient liquidity to arrive on the limit order book before the active risk position can be closed. During this waiting period, the prices of arriving orders can vary, thereby introducing the risk of slippage. Slippage occurs whenever the VWAC of inventory deviates from the dealer's reservation price. Intuitively, larger orders expose the dealer to greater slippage risk than smaller orders. This is because larger orders require a greater inventory and balance sheet commitment from the dealer which, in turn, translate into a larger active risk positions, longer expected waiting times and greater potential slippage.

The slippage premium may compensate the dealer fairly for this risk. Consider the way new offers can arrive on the limit-order book under the trade-order priority rules. When market-offers arrive on the limit order book, they will be immediately eligible to be matched against the dealer's inside bid. It turns out that when limit-offers arrive on the limit-order book, they too will be immediately eligible to be matched against the dealer's bid, except in these cases the orders will be executed at the maximum of the arriving limit-offer's price or the dealer's inside bid. (Note that market-bids are always eligible to be matched against standing limit-offers. With no offered liquidity on the limit-order book, all arriving limit-offers are eligible to be matched against the market-bid at the limit-offer price or better. Thus, if a limit-offer arrives at a price less than the inside-bid it is said to be marketable and executes immediately just like a market order at the best bid prices greater than or equal to the limit-offer price.) Thus, based on the trade order priority rules, the lowest price the dealer should expect to pay to acquire liquidity, is the inside bid. (Of course, the dealer may want to pay a lower price but in a competitive market, the dealer's bid must be at least as competitive as the prevailing inside bid in the market if the dealer's bid is to remain prioritized at the front of the queue. Even if the dealer submitted a limit-bid at a price lower than the inside bid, the dealer's bid would need to wait until it became the priority inside-bid before being executed. This would only increase waiting time and simply replicate the situation above.)

This suggests that, ultimately, the expected VWAC of inventory depends on the prevailing inside quote and underlying order placement distribution of limit-order prices. In various embodiments, these facts can be exploited to compute the slippage premium via the Black-Scholes (B-S) option pricing formula. Proceeding in the same fashion as before, the problem can be posed in terms of a dealer's expected breakeven P&L. Let p(t) represent the price of an order arriving at time t. As each order arrives, the dealer's marginal realized P&L, given their quoted price, is $$\Pi(t) = \pm(\text{Quoted Price} - p(t)) \quad (12)$$

where $\Pi$ denotes P&L, and the ± symbol is positive when the dealer quotes an offer and negative when the dealer quotes a bid price, respectively. Replacing the quoted price with the right-hand side of the Equation (2), setting P&L to zero, and rearranging terms, the realized slippage associated with an order arriving at time t can be obtained:

$$\text{Slippage}_{Offer}(t) = \max\{p(t) - \text{Inside Bid}, 0\}$$

$$\text{Slippage}_{Bid}(t) = \max\{\text{Inside Offer} - p(t), 0\} \quad (13)$$

Since the price of each arriving order can be considered a random variable, the dealer may calibrate the dealer's slippage premium to the expected slippage associated with each arriving order. Hence, for each arriving order the dealer may seek to find:

$$\text{Full Slippage Premium}_{Offer}(t) = E[\max\{p(t) - \text{Inside Bid}, 0\}]$$

$$\text{Full Slippage Premium}_{Bid}(t) = E[\max\{\text{Inside Offer} - p(t), 0\}] \quad (14)$$

Assuming that p(t) follows geometric Brownian motion, Equation (14) suggests that the full slippage premium can be computed as the price of a European option struck at the inside quote, whose value can be computed using the Black-Scholes (B-S) option pricing formula by setting the spot price equal to the mid-price and the strike price equal to the appropriate inside quote. More details regarding the B-S pricing formula may be found in Hull, *Options, Futures, and Other Derivatives*, Prentice Hall, 6$^{th}$ Ed. (2006), Chap. 13, which is incorporated herein by reference. According to various embodiments, therefore, the full slippage premium for an order arriving at time t can be obtained as follows:

$$\text{Full Slippage Premium}_{Offer}(t) = \text{Mid Price} \times e^{-ft} N(d_1) - \text{Inside Bid} \times e^{-rt} N(d_2)$$

$$\text{Full Slippage Premium}_{Bid}(t) = \text{Inside Offer} \times e^{-rt} N(-d_2) - \text{Mid Price} \times e^{-ft} N(-d_1) \quad (15)$$

where $$d_1 = \frac{\ln(m) + (r - f + .5\sigma^2)t}{\sigma\sqrt{t}},$$

$$d_2 = d_1 - \sigma\sqrt{t},$$

$$m = \text{Mid Price} / \text{Inside Quote},$$

$\sigma$ is the volatility, and r is an applicable risk free interest rate for the right-hand side currency and f is an applicable risk free interest rate for the left-hand side currency. Since in most TCA applications t will tend to be less than $1.6 \times 10^{-4}$ and r−f will tend to be relatively small, the terms involving $e^{-rt}$ and $e^{-ft}$ can usually be set to equal 1 and r−f can be set to zero. In other embodiments, a price other than the mid-price may be used as the strike price in the B-S pricing formula.

Since the notional size N of a single arriving trade order may not be sufficient to complete a transaction, a dealer may need to wait for a sequence of orders to arrive in order to acquire enough liquidity to cover an active risk position in inventory. In various embodiments, the slippage premium is computed from a strip of multiple B-S options, each option having a different tenor. If the notional size of a trade order is N, and the average size of each newly arriving order is q, then the expected number of complimentary orders required to complete a transaction is $$K = \left\lceil \frac{N}{q} \right\rceil \quad (16)$$

where the ceiling function $\lceil \cdot \rceil$ means round N/q up to the next largest integer.

Since orders arrive at random, order arrivals can be described using a Poisson process. If the mean of a Poisson process $\lambda$ represents the average rate of order arrivals per unit time (e.g. 5 orders per second, 300 orders per minute, etc. . . . ), it can be shown from the waiting time distribution of the Poisson that the expected waiting time for the next order to arrive is $$E[w] = \frac{1}{\lambda} \quad (17)$$

If $\{t_k\}_{k=1}^{K}$ represents a sequence of order arrival times, $t_1 < t_2 \ldots < t_K$, observed until enough liquidity is sourced from arriving order flow to complete a transaction, then the expected value of the k'th tenor in the strip of B-S slippage premium options is $$t_k = E[w_k] = \frac{k}{\lambda} \quad (18)$$

for $k=1, \ldots, K$. This implies that the full slippage premium may be computed as a weighted average of each slippage premium option in the strip Full Slippage $Premium_{Offer} =$ (19)

$$N^{-1} \sum_{k=1}^{K} \hat{q} \times \text{Full Slippage } Premium_{Offer}(t_k)$$

Full Slippage $Premium_{Bid} =$ $$N^{-1} \sum_{k=1}^{K} \hat{q} \times \text{Full Slippage } Premium_{Bid}(t_k)$$

where $\hat{q}$ equals q for $k=1, \ldots, K-1$ and $\min\{N-(K-1)q,q\}$ for $k=K$. Inserting this last result into Equation (2) shows that when filling an order against newly arriving order flow the quoted price is effectively equal to the inside quote, plus the expected slippage computed from a strip of B-S options:

Quoted Price$_{Offer}$=Inside Bid+Full Slippage Premium$_{Offer}$

Quoted Price$_{Bid}$=Inside Offer−Full Slippage Premium$_{Bid}$ (20).

From the dealer's perspective:

Quoted Price$_{Offer}$=Inside Bid+$w_L$×Full Liquidity Premium$_{Offer}$+$w_S$×Full Slippage Premium$_{Offer}$ Quoted Price$_{Bid}$=Inside Offer−$w_L$×Full Liquidity Premium$_{Bid}$−$w_S$×Full Slippage Premium$_{Bid}$ (21)

Unfortunately, in practice this result is only useful for a dealer, since the information required to estimate the full liquidity premium, i.e. the particular configuration of the dealer's limit order book, is proprietary and not transparent. However, for Equation (21) to be broadly applicable, all that is required is to garner an estimate of the full liquidity premium. Recall that $$\begin{aligned}
\text{Full Liquidity } Premium_{Offer} &= \text{Liquidity } Premium_{Offer} + \quad (22) \\
&\quad \text{Spread} \\
&= \max\{VWAC - \text{Inside Offer}, 0\} + \\
&\quad \text{Spread} \\
&= \max\{VWAC - \text{Inside Bid}, 0\} \\
\text{Full Liquidity } Premium_{Bid} &= \text{Liquidity } Premium_{Bid} + \\
&\quad \text{Spread} \\
&= \max\{\text{Inside Bid} - VWAC, 0\} + \\
&\quad \text{Spread} \\
&= \max\{\text{Inside Offer} - VWAC, 0\}
\end{aligned}$$

This implies that $$E[\text{Full Liquidity Premium}_{Offer}] = E[\max\{VWAC - \text{Inside Bid}, 0\}]$$

$$E[\text{Full Liquidity Premium}_{Bid}] = E[\max\{\text{Inside Offer} - VWAC, 0\}] \quad (23)$$

In other words, the expected value of the liquidity premium can be determined directly from the same B-S methodology used to compute the slippage premium. This suggests that the results obtained in Equations (15) through (20) can serve as the practical basis for a TCA framework. Supporting this notion is the fact that standing orders on the limit-order book originated from arriving order flow in the first place. Thus, the VWAC configuration of the limit-order book can be expected to converge asymptotically to the underlying distribution of limit-order prices. As long as one assumes that the limit-order placement distribution is characterized by a mean and a variance, the Principle of Maximum Entropy suggests that the Gaussian normal distribution can serve as the most representative and least committal distributional form to explain the VWAC of dealer inventory.

In various embodiments, the transaction costs are characterized relative to the mid-price. This helps to facilitate TCA comparisons between both buy and sell transactions and across currencies. In addition, standardizing the B-S transaction cost equation around the mid-price helps to reveal the three fundamental sources of transaction costs: the visible bid-offer spread, the size of an order relative to the depth of market liquidity and price volatility. To standardize the B-S transaction cost equation around the mid-price, start by dividing both sides of Equation (15) by the mid-price, yielding:

$$\frac{\text{Full Slippage } Premium_{Offer}(t)}{\text{Mid Price}} = N(d_1) - (1 - S/2) \times N(d_2) \quad (24)$$

$$\frac{\text{Full Slippage } Premium_{Bid}(t)}{\text{Mid Price}} = (1 + S/2) \times N(-d_2) - N(-d_1)$$

Then insert this result into Equation (20) to obtain:

$$\frac{\text{Quoted } Price_{Offer}}{\text{Mid Price}} - 1 = \frac{\text{Inside Bid}}{\text{Mid Price}} + \frac{\text{Full Slippage } Premium_{Offer}}{\text{Mid Price}} - 1 \quad (25)$$

$$= -\frac{S}{2} + N^{-1} \sum_{k=1}^{K} \hat{q} \left[ \begin{array}{c} N(d_1(t_k)) - \\ \left(1 - \frac{S}{2}\right) \times N(d_2(t_k)) \end{array} \right]$$

$$\frac{\text{Quoted } Price_{Bid}}{\text{Mid Price}} - 1 = \frac{\text{Inside Offer}}{\text{Mid Price}} - \frac{\text{Full Slippage } Premium_{Bid}}{\text{Mid Price}} - 1$$

$$= \frac{S}{2} - N^{-1} \sum_{k=1}^{K} \hat{q} \left[ \begin{array}{c} \left(1 + \frac{S}{2}\right) \times \\ N(-d_2(t_k)) - N(-d_1(t_k)) \end{array} \right]$$

In Equations (24) and (25), the term S denotes the bid-offer spread expressed as a percentage of the mid-price (i.e. S=(Inside Offer−Inside Bid)/Mid Price), which enables the terms $d_1(t_k)$ and $d_2(t_k)$ to be written as $$d_1(t_k) = \frac{-\ln(1 \mp S/2) + .5\sigma^2 t_k}{\sigma \sqrt{t_k}}$$

(the $\mp$ symbol applying to quoted offers and bid prices, respectively) and $d_2 = d_1 - \sigma\sqrt{t_k}$. In Equation (24) the terms involving r and f have been ignored as explained above.

Equation (25) expresses the full cost of a transaction in terms of how much the quoted price deviates from the mid-price, on a percentage basis. Equation (25) shows that the full cost of a transaction is attributable to three core factors: (1) the visible bid-offer spread, S, expressed as a percentage of the mid-price; (2) the relative size of an order compared to the depth of market liquidity, given by the sequence of expected order arrival waiting times $\{t_k\}_{t=1}^{K}$ obtained from Equations (16) through (18); and (3) the expected volatility prevailing over the order arrival waiting period. Each of these parameters can be estimated ex-ante, which means that a transaction cost metric (e.g., Equation (25)) can be computed pre-trade, rather than waiting until a transaction is complete. For example, the transaction cost metric (Equation 25) could be computed pre-trade using trade order inception market conditions.

By standardizing the B-S transaction cost equation around the mid-price, the burden of explicitly identifying the inside bid or offer prevailing in the market is also alleviated, which in turns eliminates the need to explicitly identify the prevailing mid-price. As long as a visible spread is assumed, Equation (25) permits the inside bid/offer to be implicitly accounted for. This is quite valuable because in the OTC currency market, bid-offer quotes always represent dealer quoted prices; market participants technically never see a dealer's inside quotes. By expressing the inside quotes in terms of a percentage spread added/subtracted from the mid-price, any hidden reservation price can be accommodated with consistent results in the TCA framework. In fact, by setting the spread to zero, it is assumed that all dealers share the mid-price as a reservation price and that a dealer's quoted price always reflects the mid-price plus/minus a slippage premium to cover the dealer's risk for procuring liquidity in the transaction. This is why the first term on the right hand side of Equation (25) subtracts or adds S/2 (depending on whether the trade is an offer or bid); since the full slippage premium computed by B-S includes the full spread, one half the spread must be discounted from the quoted price if the standard reference is the mid-price.

Equation (25) can be further rewritten if the assumption of mid reference pricing (i.e. zero spread) is assumed:

$$\frac{\text{Quoted } Price_{Offer}}{\text{Mid Price}} - 1 = \quad (26)$$

$$N^{-1} \sum_{k=1}^{K} \hat{q}\left[2N\left(.5 \times \sigma\sqrt{t_k}\right) - 1\right] = \frac{\text{Quoted } Price_{Bid}}{\text{Mid Price}} - 1$$

where use is made of the fact that $N(-x)=1-N(x)$. Equation (26) shows that when pricing relative to the mid price, transaction costs are fully attributable to a slippage premium to cover a dealer's risk of procuring inventory. This slippage premium ultimately calibrated to the characteristics of order flow, which can be described succinctly by expected order arrival waiting times and expected price volatility. Equation (26) effectively permits one to compute transaction costs ex-ante, and to compute precise market impact assessments for orders of varying size given an assumed order flow rate and volatility.

Figure 1:
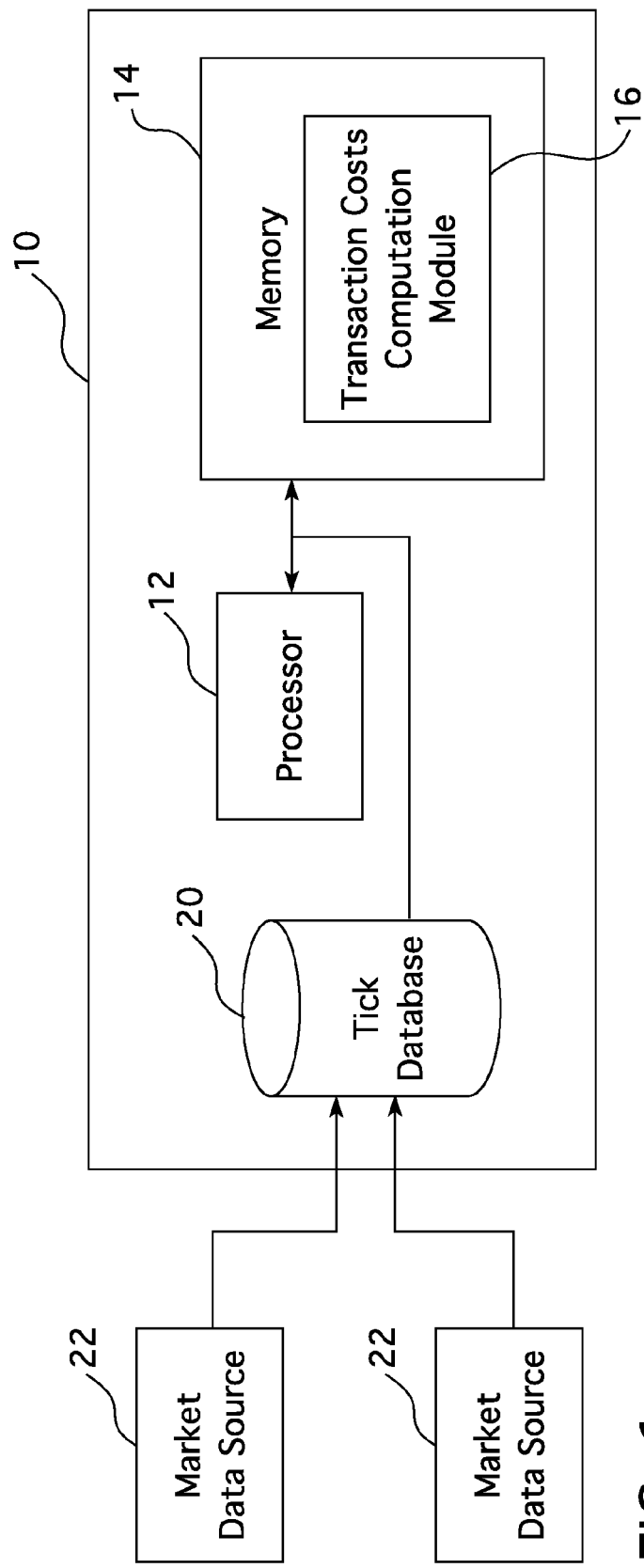
FIG. 1 is a block diagram of a computer system for estimating transaction costs for a trade involving a tradable financial product according to various embodiments of the present invention.

FIG. 1 is a diagram of a computer system 10 for computing a transaction cost metric that can be used to assess a quoted price for a trade order involving a tradable financial product (such as a FX pair) according to various embodiments of the present invention. The computed transaction cost metric, which could be computed using Equations (25) and/or (26), for example, can be compared pre-trade to a dealer's quoted price for the trade order to assess whether the dealer's price is fair given the size of the order and the prevailing market conditions. Before describing the mechanisms for computing the metric, a brief description of the computer system 10 is provided. The computer system 10 may comprise one or more networked, electronic computer devices, such as servers, personal computers, workstations, mainframes, laptops, and/or handheld computing devices. The computer device(s) may comprise one or more processors 12 and one or more computer memories 14. The processor(s) 12 and the computer memory(ies) 14 may comprise integrated circuits, for example. In one embodiment, the processor(s) 12 and the computer memory(ies) 14 may comprise separate integrated circuits, although in other embodiments they may be combined in a common integrated circuit. For convenience, only one processor 12 and only one memory 14 are shown in FIG. 1. The processor 12 may have one or multiple cores. The memory 14 may comprise primary computer memory, such as a read only memory (ROM) and/or a random access memory (e.g., a RAM). The memory could also comprise secondary memory, such as magnetic or optical disk drives or flash memory, for example.

As shown in FIG. 1, the memory 14 may comprise a transaction costs computation module 16. The transaction costs computation module 16 may comprise computer software instructions that when executed by the processor 12 cause the processor 12 to compute the transaction cost metric for a trade order involving a tradable financial product, such as a FX currency pair, using the techniques described herein. The transaction costs computation module 16 may compute the transaction cost metric based on inputs regarding the trade order and/or data stored in a computer database 20. The database 20 may store, among other things, tick data received from one or more market data sources 22. The tick data may comprise time-stamped price data published by the market data sources 22. The tick data may comprise: (1) time-stamped indicative price quotes (i.e., limit orders to buy or sell the financial product at a specified price) and (2) time-stamped data regarding completed transactions involving the financial product. For FX, time-stamped data regarding completed transactions are often referred to as "paid-given" data, which indicates the price paid or given for an executed FX transaction involving a currency pair.

According to various embodiments, inputs needed to compute the transaction cost metric may comprise: (i) the type of order (e.g., bid or offer); (ii) the notional size of the order (N); (iii) the average rate of order arrivals per unit time (λ); (iv) the assumed volatility (σ); and (v) the assumed bid-offer spread. These values may be input by a user (e.g., a FX market participant) to the computer system 10, calculated by the computer system 10 using data from the database 20, and/or default values could be used. For example, a user (e.g., a FX market participant) may input the type of trade order and the notional size of the order (N) via a computer network, such as described below in connection with FIG. 11. The computer system 10 could estimate the average rate of order arrivals per unit time (λ) based on the tick data in the database 20 or a default value could used or the user could input a desired λ. Similarly, computer system 10 could estimate the assumed volatility (σ) based on the tick data in the database 20, a default value could be used, or the user could input a desired σ. Also, the user could input an applicable bid-offer spread or tick data could be used to determine the applicable bid-offer spread.

FIG. 8 is a flowchart of a process executed by the computer system 10 (such as when executing the code of the transaction cost computation module 16) for computing the transaction cost metric. Although the steps of FIG. 8 are shown in a particular serialized order, some of the steps may be performed in various orders and/or at the same time. The illustrated process starts at step 40, where the number of complimentary orders K required to complete the order is computed. K may be computed per Equation (16) above as $$K = \left\lceil \frac{N}{q} \right\rceil.$$

The transaction cost metric may be computed, as described below, as an average value of a strip of K options. Next, at step 42, the tenors $t_k$ of the K options are computed. The tenors $t_k$ may be computed using Equation (18) above as $$t_k = \frac{k}{\lambda},$$

where $t_k$ is the tenor of the $k^{th}$ option in the strip, k=1, . . . , K.

If the volatility σ needs computed, it may be computed at step 44. The volatility can be computed using any suitable statistical technique. FIGS. 9a-9d present the average rate of order arrivals, order arrival waiting times, order flow and order size observed throughout the London day on the EBS™ dealing platform. For FX, as can be seen from FIG. 9b, the expected waiting time for an order arrival is typically less than a minute. This can make volatility estimation challenging because there is no implied volatility market for such ultra-short dated tenors, and statistical estimates can be highly inaccurate due to the small and variable order arrival sample sizes that carry price information. Therefore, according to various embodiments, range implied volatility (RIV) can be used to estimate the ultra-short term volatility. RIV is a parametric estimate of the standard normal deviation that is consistent, up to a specified confidence level, with an observed high/low price range observed over an intra-period time interval. RIV (denoted $\sigma_{RIV}$) may be defined as:

$$\sigma_{RIV} = \frac{R}{2z_\alpha}\sqrt{h} = \frac{\ln(HighPrice) - \ln(LowPrice)}{2z_\alpha}\sqrt{h} \quad (26)$$

where R represents the expected intra-period price range that might be observed over a short-term time interval. As shown above, R may be defined as the log-difference between the high price and the low price that might be observed during the time interval. The variable $z_\alpha$ represents a standard normal value, associated with a confidence percentile α, and h denotes the number of waiting periods of duration t that there are per year, for example. The above equation is a re-arrangement of the well-known standard "z-score" (i.e., $z=(x-\mu)\sigma^{-1}$), where the value of a random variable x is normalized in terms of the standard normal distribution. For example, to find the RIV that would be consistent with a given high/low price range with a 99% confidence, z would be chosen to be z≅2.58. If the time interval for this high/low price range is one minute, then h=368,640 (i.e., the number of minutes per year, 256 trading days×24 hours/day×60 minutes/hr).

One benefit of using the RIV measure is that estimates of volatility can be obtained using either empirical data or a purely subjective viewpoint. FIGS. 10a through 10d show the RIV levels observed in 2009 for EURUSD between Jan. 1 and Jul. 21, 2009. To compute these RIVs, in various embodiments, the observed price range over each minute in every day of the data sample can be isolated. The data in each particular minute can be pooled and the median, mean, 75th percentile and maximum of the values for that particular minute can be computed. The resulting price range statistics can then used to compute the RIV over each minute of the London trading day. Notice how the RIV cycles throughout the day, rising and falling as market liquidity increases and decreases. Comparing FIGS. 10a through 10d to FIGS. 9a through 9d shows that RIVs are low when order flow is slow. The rationale behind this phenomenon is that fewer orders mean fewer price messages, implying that the range of price changes that can be observed over a given minute is more likely to be constrained. To picture why this would be so, imagine each arriving order containing a message with information about whether prices should rise and fall. If no orders arrive during the period, prices cannot change, so the high and low prices would be equal during the period. In this situation both the intra-period price range and RIV would be zero. With a single order arrival, prices can only move up or down once. To produce a big price move, the information contained in that single order's message would need to be unusual. However, when many orders arrive, prices have the chance to move up and down many times, effectively describing a random-walk diffusion process. The RIV implicitly measures the breadth and dispersion of this diffusion process.

Returning to FIG. 8, at step 50, the value of each option in the strip of K options may be computed using a B-S option pricing formula. In various embodiments, as described above, the option values may be referenced to the mid-price. For example, the strike price used in the B-S pricing formula may be an applicable inside price for the financial product at order inception (e.g., inside bid or offer), and the spot price may be the mid-price for the financial product at order inception, although in other embodiments different selections for the strike and/or spot prices may be used to compute the option values. The option values can be computed at step 50 using Equations (15) or (24) described above. Next, at step 52, the transaction cost metric (e.g., the slippage premium) may be computed based on the computed values for each of the K options in the strip. For example, the transaction cost metric may be computed as a weighted average of the computed option values, as described above. The transaction cost metric may be computed in various embodiments using either Equation (25) or Equation (26) described above.

In many cases order flow can be quite difficult to measure. This is true for many emerging market currencies. Even for the most liquid developed market currencies, estimates of order flow obtained from a particular platform may not be fully representative of the order flows in the market as a whole. In these situations, measuring the characteristic waiting time of a transaction can yield valuable information about order flows. The characteristic waiting time of a transaction measures the expected amount of time it would take to fully complete a transaction of a given size. It is defined as $$E[\hat{W}] = \left\lceil \frac{N}{q} \right\rceil \lambda^{-1} \qquad (27)$$

where N represents the notional amount of the transaction; q represents the average order size; and λ the order arrival rate. The bracket notation ⌈x⌉ denotes the ceiling function, which says round x to the next highest integer. For example, assume that it takes fifty (50) seconds to complete an order for USD 100 Mn equivalent of currency and we wish to determine the rate of order flow that would be consistent with this result. Assuming that q=1, λ=120 Mn orders per minute (USD 100 Mn divided by 5/6 minutes).

FIGS. 7a through 7d show that the slippage premium is both time sensitive and risk sensitive, which is an intuitive result that stems from options pricing theory. In fact, currency transaction costs possess the same price sensitivity characteristics as options, including theta and vega. Theta measures the change in an option's value with respect to the tenor and vega measures the change in an option's value with respect to volatility. An important corollary to this last observation is that: increased waiting time to complete an order increases transaction costs through slippage; a cost that will increase as a function of market risk. Practitioners should be aware of this fact when breaking up orders into smaller size. Although this practice may alleviate the liquidity impact of an order, it simply substitutes slippage for liquidity impact. The TCA described herein indicates that practitioners should carefully verify the cost-benefit of breaking up orders to ensure that the cost of liquidity impact exceeds the cost of slippage.

By observing the average number of order arrivals per unit time (FIG. 9a), the expected waiting time for an order to arrive can be computed using $$E[W] = \frac{1}{\lambda}.$$

By monitoring the average size of arriving orders, Equation (16) can be used to derive the expected number of orders that will be required to complete a particular size transaction. Equation (18) can then be used to derive the tenors in the strip of options needed to compute the slippage premium.

In various embodiments, the transaction cost metric may be provided in response to a request from a market participant. For example, in various embodiments, a web site may provide a user interface for a market participant to enter particulars about a proposed trade order for a financial product, such as type of trade, product, and trade size. FIG. 11 shows an embodiment where a market participant 80 may place a request to calculate the transaction cost metric via a web-based user interface. The web-based user interface may be hosted by one or more web servers 82. The market participant 80 may connect to the web server 82 via a data communications network 84, such as the Internet or some other suitable data communications network. The web pages served by the web server 82 may allow the market participant 80 to specify the particulars for the proposed trade, including: (i) the financial product (e.g., currency pair for spot FX trade); (ii) the type of trade (buy or sell); and (iii) the notional order size. As described above, the market participant could also, in various embodiments, specify the assumed volatility (σ), the order arrival rate (λ), and the bid-offer spread. In various embodiments, once the relevant information for the trade is entered via the web-based user interface, the web server 82 (or some other computer system 10 in communication with the web server 82) may compute the transaction cost metric, such as Equation (25) or (26), The market participant 80 can evaluate a dealer quoted price for the trade using the computed transaction cost metric, the value for which may be transmitted from the web server 82 to the market participant 80 via the network 84.

FIG. 12 and the following discussion are intended to provide a brief general description of a suitable computing environment in which the described embodiments of the computer system 10 may be implemented. It should be understood, however, that handheld, portable, and other computing devices and computing objects of all kinds are contemplated for use in connection with the described embodiments. FIG. 12 illustrates one example of a suitable computing system environment 1000 in which the described embodiments may be implemented, such as for the computer system 10. Although as made clear above, the computing system environment 1000 is only one example of a suitable computing environment and is not intended to suggest any limitation as to the scope of use or functionality of the described embodiments. Neither should the computing environment 1000 be interpreted as having any dependency or requirement relating to any one or combination of components illustrated in the operating computing environment 1000. With reference to FIG. 12, one embodiment of a system for implementing the described embodiments comprises a general-purpose computing device in the form of a computer system 1100. Components of the computer system 1100 may comprise a processing unit 1200, a system memory 1300, and a system bus 1210 that couples various system components including the system memory 1300 to the processing unit 1200. The system bus 1210 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

The computer system 1100 generally comprises a variety of computer readable media. Computer readable media can be any available media that can be accessed by the computer system 1100 and includes both volatile and nonvolatile media, removable, and non-removable media. Computer storage media includes volatile and nonvolatile, removable, and non-removable media implemented in any method or technology for storage of information such as computer readable instructions, data structures, program modules, or other data. The tick data may be stored in nonvolatile memory of the computer system 1100. Computer storage media includes, but is not limited to, Random Access Memory (RAM), Dynamic RAM (DRAM), Double-Data-Rate DRAM (DDRAM), Synchronous DRAM (SDRAM), Static RAM (SRAM), Programmable ROM (PROM), Read Only Memory (ROM), Electrically Erasable Programmable Read Only Memory (EEPROM), flash memory, polymer memory such as ferroelectric polymer memory, ovonic memory, phase change or ferroelectric memory, silicon-oxide-nitride-oxide-silicon (SONOS) memory, Compact Disk Read Only Memory (CDROM), Compact Disc-rewritable (CDRW) Digital Versatile Disks (DVD) or other optical disk storage, magnetic cassettes, magnetic tape, magnetic disk storage or other magnetic storage devices, or any other medium which can be used to store the desired information and which can be accessed by the computer system 1100. It is worthy to note that some portion or the entire computer storage medium may be included in other elements of the apparatus computer system 1100. For instance, some or all of computer storage medium may be included on the same integrated circuit or chip with elements of the computer system 1100 (e.g., processing unit 1200). Alternatively, some portion or the entire computer storage medium may be disposed on an integrated circuit or other medium (e.g., a hard disk drive) that is external.

Figure 6:
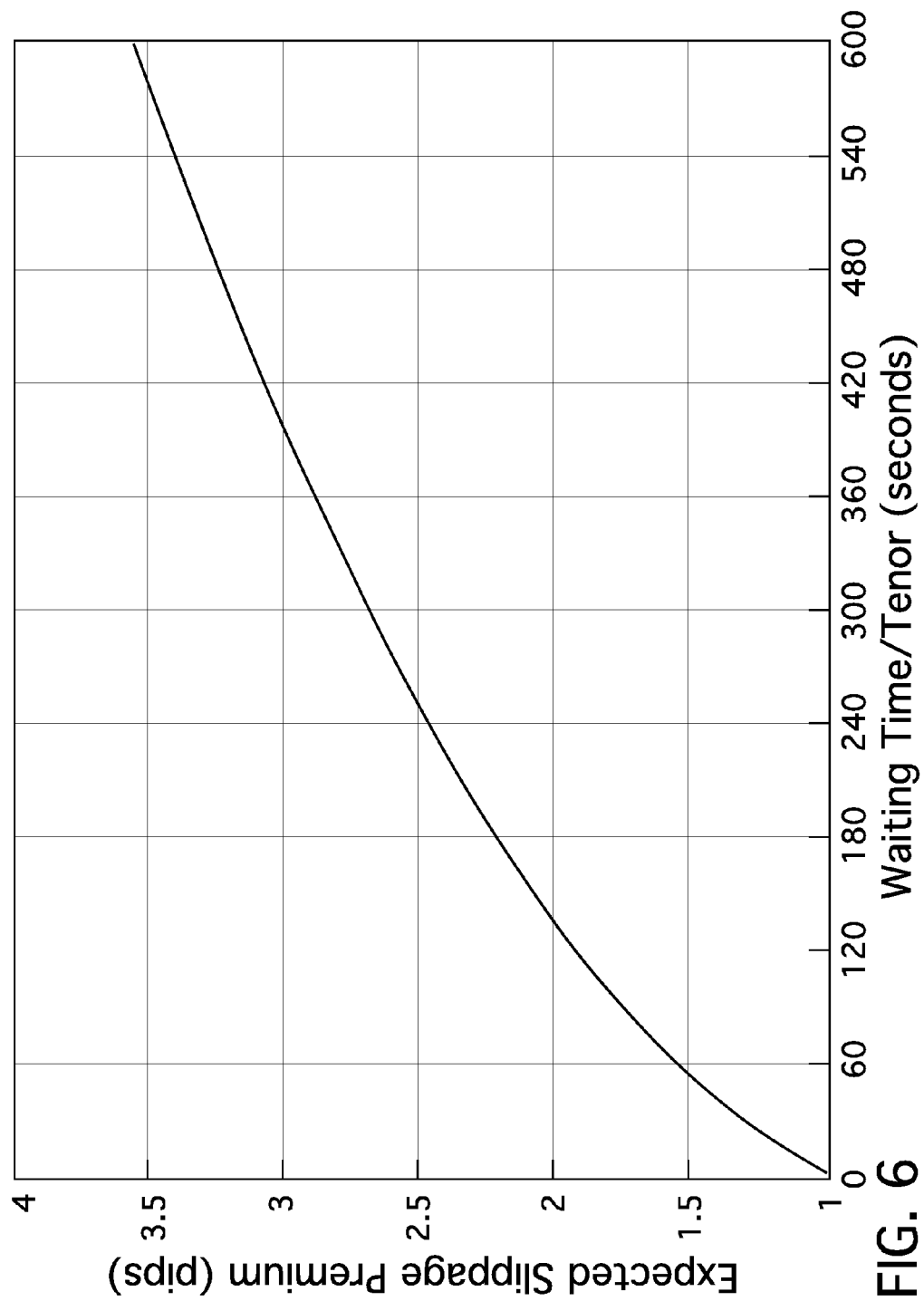
FIG. 6 is a graph showing slippage premium option strip values as a function of tenor according to an example of the present invention.
Figure 7A:
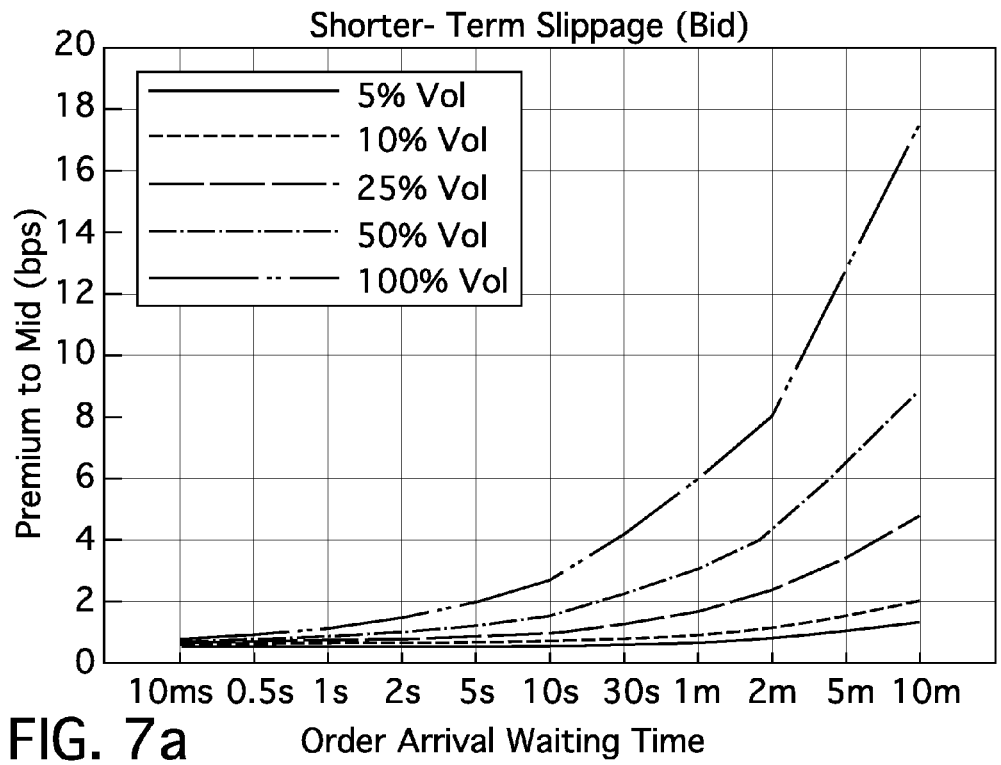
Figure 7B:
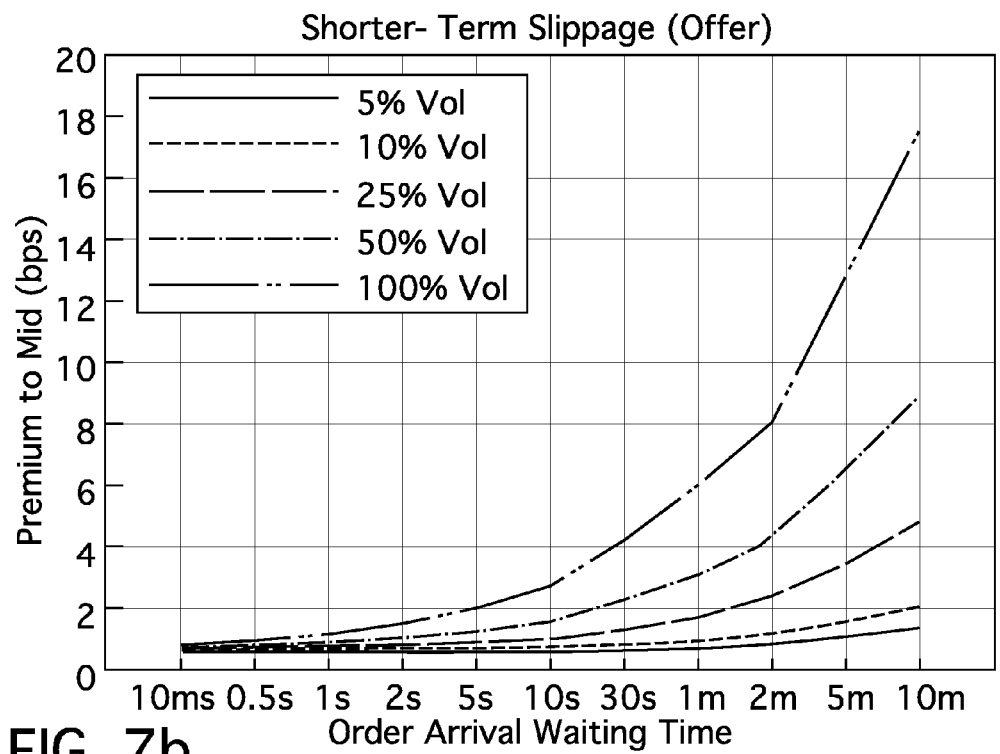
Figure 7C:
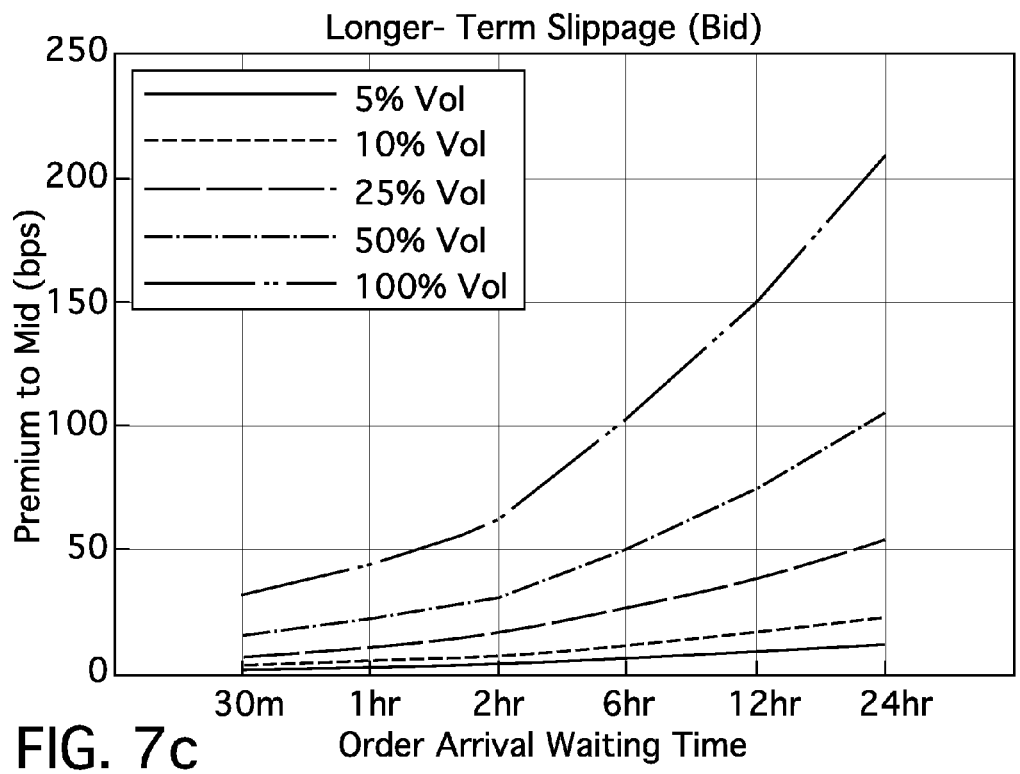
Figure 7D:
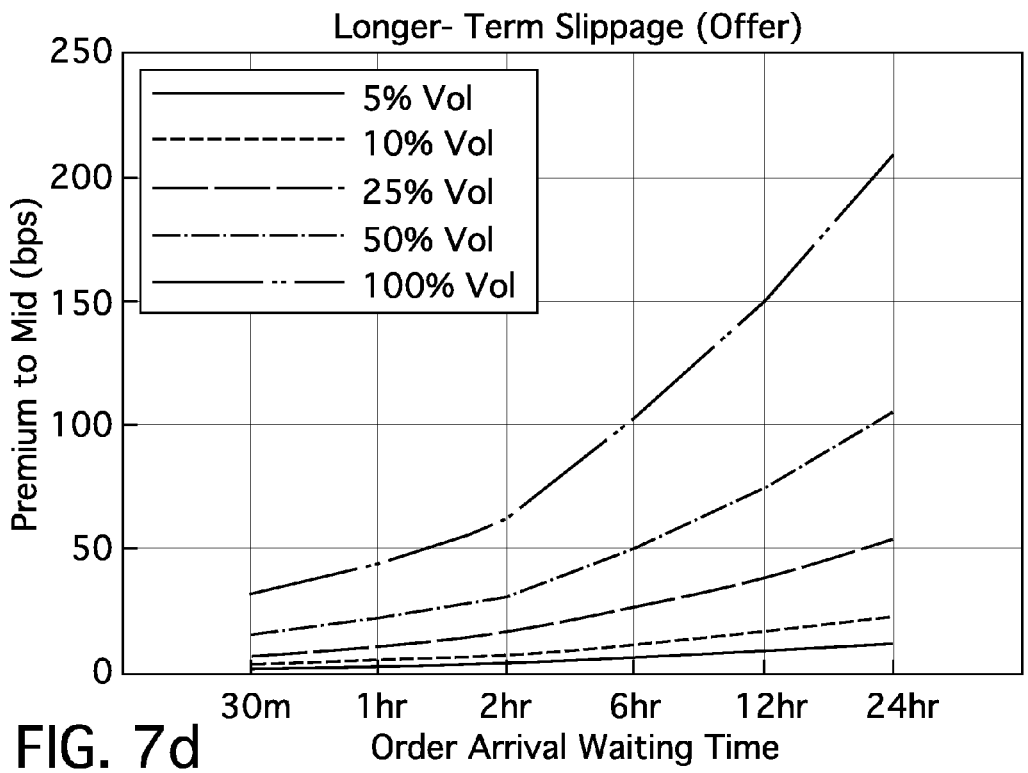

The system memory 1300 includes computer storage media in the form of volatile and/or nonvolatile memory such as ROM 1310 and RAM 1320. A basic input/output system 1330 (BIOS), containing the basic routines that help to transfer information between elements within the computer system 1100, such as during start-up, is typically stored in the ROM 1310. The RAM 1320 typically contains data and/or program modules that are immediately accessible to and/or presently being operated on by the processing unit 1200. By way of example, and not limitation, FIG. 6 illustrates an operating system 1340, one or more application programs 1350, other program modules 1360, and program data 1370.

The computer system 1100 also may comprise other removable/non-removable, volatile/nonvolatile computer storage media. By way of example only, FIG. 6 illustrates a hard disk drive 1410 that reads data from or writes data to non-removable, nonvolatile magnetic media, a magnetic disk drive 1510 that reads data from or writes data to a removable, nonvolatile magnetic disk 1520, and an optical disk drive 1550 that reads data from or writes data to a removable, nonvolatile optical disk 1560, such as a CD ROM, CDRW or other optical media. Other removable/non-removable, volatile/nonvolatile computer storage media that can be used in the example operating environment include, but are not limited to, magnetic tape cassettes, flash memory cards, digital versatile disks, digital video tape, solid state RAM, solid state ROM, and the like. The hard disk drive 1410 is typically connected to the system bus 1210 through a non-removable memory interface such as interface 1400, and magnetic disk drive 1510 and optical disk drive 1550 are typically connected to the system bus 1210 by a removable memory interface, such as interface 1500.

The drives and their associated computer storage media discussed above and illustrated in FIG. 6 provide storage of computer readable instructions, data structures, program modules, and other data for the computer system 1100. In FIG. 6, for example, the hard disk drive 1410 is illustrated as storing an operating system 1440, one or more application programs 1450, other program modules 1460, and program data 1470. Note that these components can either be the same as or different from the operating system 1340, the one or more application programs 1350, the other program modules 1360, and the program data 1370. The operating system 1440, the one or more application programs 1450, the other program modules 1460, and the program data 1470 are given different numbers here to illustrate that, at a minimum, they are different copies. A user may enter commands and information into the computer system 1100 through input devices such as a keyboard 1620 and pointing device 1610, commonly referred to as a mouse, trackball, or touch pad, and a scanner 1490. Other input devices (not shown) may include a microphone, joystick, game pad, satellite dish, or the like. These and other input devices are often connected to the processing unit 1200 through a user input interface 1600 that is coupled to the system bus 1210, but may be connected by other interface and bus structures, such as a parallel port, game port or a universal serial bus (USB). A display device 1910 or other type of display device is also connected to the system bus 1210 via an interface, such as a video interface 1900, which may in turn communicates with video memory (not shown). In addition to the display device 1910, computer systems also may include other peripheral output devices such as speakers 1970 and a printer 1960, which may be connected through an output peripheral interface 1950.

The computer system 1100 may operate in a networked or distributed environment using logical connections to one or more remote computers, such as a remote computer 1800. The remote computer 1800 may be a personal computer, a server, a router, a network PC, a peer device or other common network node, and typically includes many or all of the elements described above relative to the computer system 1100, although only a memory storage device 1810 has been illustrated in FIG. 6. The logical connections depicted in FIG. 6 include a local area network (LAN) 1710 and a wide area network (WAN) 1730, but may also include other networks/buses. Such networking environments are commonplace in homes, offices, enterprise-wide computer networks, intranets, and the Internet.

When used in a LAN networking environment, the computer system 1100 is connected to the LAN 1710 through a network interface or adapter 1700. When used in a WAN networking environment, the computer system 1100 generally includes a modem 1720 or other means for establishing communications over the WAN 1730, such as the Internet. The modem 1720, which may be internal or external, may be connected to the system bus 1210 via the user input interface 1600, or other appropriate mechanism. In a networked environment, program modules depicted relative to the computer system 1100, or portions thereof, may be stored in the remote memory storage device. By way of example, and not limitation, FIG. 6 illustrates one or more remote application programs 1850 as residing on the memory device 1810. It will be appreciated that the network connections shown are non-limiting examples and other means of establishing a communications link between the computers may be used.

According to various embodiments, the present invention is directed to a computer system for computing a transaction cost metric for a trade order involving a tradable financial product. The transaction cost metric may be the metrics of Equations (25) and/or (26) above, or modifications thereof. The computer system comprises at least one processor and at least one memory unit in communication with the at least one processor. The at least one memory unit stores instructions that when executed by the at least one processor cause the at least one processor to: (1) compute a number of complimentary orders K required to complete the trade order based on a notional size N for the trade order, where K≥1; (2) compute values for each option in a strip of K options using an option pricing formula, where each of the K options has a different tenor, and where respective tenors for each of the K options in the strip correspond to expected waiting times for each of the number of complimentary orders K required to fill the trade order; and (3) compute the transaction cost metric based on the computed values for each option in the strip of K options.

According to other embodiments, the present invention is directed to a computer-implemented method for computing a transaction cost metric for a trade order involving a tradable financial product. The method may comprise: (1) computing, by a programmable computer system, a number of complimentary orders K required to complete the trade order based on a notional size N for the trade order, wherein K≥1; (2) computing, by the programmable computer system, values for each option in a strip of K options using an option pricing formula, wherein each of the K options has a different tenor, and wherein respective tenors for each of the K options in the strip correspond to expected waiting times for each of the number of complimentary orders K required to fill the trade order; and (3) computing, by the programmable computer system, the transaction cost metric based on the computed values for each option in the strip of K options.

According to other embodiments, the present invention is directed to a computer readable medium having stored thereon instructions that, when executed by a processor, cause the processor to: (1) compute a number of complimentary orders K required to complete the trade order based on a notional size N for the trade order, wherein K≥1; (2) compute values for each option in a strip of K options using an option pricing formula, wherein each of the K options has a different tenor, and wherein respective tenors for each of the K options in the strip correspond to expected waiting times for each of the number of complimentary orders K required to fill the trade order; and (3) compute the transaction cost metric based on the computed values for each option in the strip of K options.

According to various implementations, the tradable financial product comprises a FX currency pair. Also, the transaction cost metric may be referenced to a mid-price for the financial product at trade order inception. In addition, computing the transaction cost metric may comprise computing the transaction cost metric as an average of the computed values for each option in the strip of K options. Also, the tenors for each option in the strip of K options may be computed. The tenors may be computed by, for each k, where k=1, 2, ..., K, dividing k by an average rate of order arrival per unit time to determine the tenor for the k th option in the strip of K options comprises. The option pricing formula may use a strike price and a spot price for each option in computing the value for the option, and the strike price may be an inside price for the financial product at order inception. The spot price may be a mid-price for the financial product at order inception. Also, a volatility for the financial product may be computed, where the computed volatility is used in the option pricing formula to compute the values for the options in the strip.

Reference throughout the specification to "various embodiments," "some embodiments," "one embodiment," "an embodiment," and the like means that a particular feature, structure, or characteristic described in connection with the embodiment is included in at least one embodiment. Thus, appearances of the phrases "in various embodiments," "in some embodiments," "in one embodiment," "in an embodiment," and the like in places throughout the specification are not necessarily all referring to the same embodiment. Furthermore, the particular features, structures, or characteristics may be combined in any suitable manner in one or more embodiments. Thus, the particular features, structures, or characteristics illustrated or described in connection with one embodiment may be combined, in whole or in part, with the features structures, or characteristics of one or more other embodiments without limitation.

The examples presented herein are intended to illustrate potential and specific implementations of the embodiments. It can be appreciated that the examples are intended primarily for purposes of illustration for those skilled in the art. No particular aspect or aspects of the examples is/are intended to limit the scope of the described embodiments. The figures and descriptions of the embodiments have been simplified to illustrate elements that are relevant for a clear understanding of the embodiments, while eliminating, for purposes of clarity, other elements.

While various embodiments have been described herein, it should be apparent that various modifications, alterations, and adaptations to those embodiments may occur to persons skilled in the art with attainment of at least some of the advantages. The disclosed embodiments are therefore intended to include all such modifications, alterations, and adaptations without departing from the scope of the embodiments as set forth herein.

What is claimed is:

1. A computer system for computing a transaction cost metric for a trade order involving a tradable financial product, the computer system comprising:
   at least one processor; and
   at least one memory unit in communication with the at least one processor, wherein the at least one memory unit stores instructions that when executed by the at least one processor cause the at least one processor to:
   compute a number of complimentary orders K required to complete the trade order based on a notional size N for the trade order, wherein K≥1;
   compute values for each option in a strip of K options using an option pricing formula, wherein each of the K options has a different tenor, and wherein respective tenors for each of the K options in the strip correspond to expected waiting times for each of the number of complimentary orders K required to fill the trade order; and
   compute the transaction cost metric based on the computed values for each option in the strip of K options.

2. The computer system of claim 1, wherein the transaction cost metric is referenced to a mid-price for the financial product at trade order inception.

3. The computer system of claim 1, wherein the at least one processor is further programmed to compute the transaction cost metric based on an average of the computed values for each option in the strip of K options.

4. The computer system of claim 1, wherein the at least one processor is further programmed to compute the tenors for each option in the strip of K options.

5. The computer system of claim 4, wherein the at least one processor is further programmed to compute the tenors for each option in the strip of K options by, for each k, where k=1, 2, ..., K, dividing k by an average rate of order arrival per unit time to determine the tenor for the kth option in the strip of K options comprises.

6. The computer system of claim 1, wherein the option pricing formula uses a strike price and a spot price, and wherein, for each of the K options, the strike price is an inside price for the financial product at order inception.

7. The computer system of claim 6, wherein the spot price is a mid-price for the financial product at order inception.

8. The computer system of claim 7, wherein the at least one processor is further programmed to compute a volatility for the financial product, wherein the computed volatility is used in the option pricing formula to compute the values for the options in the strip.

9. The computer system of claim 8, wherein the volatility comprises a range implied volatility.

10. The computer system of claim 1, wherein the tradable financial product comprises an FX currency pair.

11. A method for computing a transaction cost metric for a trade order involving a tradable financial product, the method comprising:
   computing, by a programmable computer system, a number of complimentary orders K required to complete the trade order based on a notional size N for the trade order, wherein K≥1;
   computing, by the programmable computer system, values for each option in a strip of K options using an option pricing formula, wherein each of the K options has a different tenor, and wherein respective tenors for each of the K options in the strip correspond to expected waiting times for each of the number of complimentary orders K required to fill the trade order; and
   computing, by the programmable computer system, the transaction cost metric based on the computed values for each option in the strip of K options.

12. The method of claim 11, wherein the transaction cost metric is referenced to a mid-price for the financial product at trade order inception.

13. The method of claim 11, wherein computing the transaction cost metric comprises computing the transaction cost metric as an average of the computed values for each option in the strip of K options.

14. The method of claim 11, further comprising computing the tenors for each option in the strip of K options.

15. The method of claim 14, wherein computing the tenors for each option in the strip of K options comprises, for each k, where k=1, 2, . . . , K, dividing k by an average rate of order arrival per unit time to determine the tenor for the kth option in the strip of K options comprises.

16. The method of claim 11, wherein the option pricing formula uses a strike price and a spot price, and wherein, for each of the K options, the strike price is an inside price for the financial product at order inception.

17. The method of claim 16, wherein the spot price is a mid-price for the financial product at order inception.

18. The method of claim 17, further comprising computing, by the programmable computer system, a volatility for the financial, product, wherein the computed volatility is used in the option pricing formula to compute the values for the options in the strip.

19. The method of claim 18, wherein the volatility comprises a range implied volatility.

20. A computer readable medium having stored thereon instructions that, when executed by a processor, cause the processor to:
   compute a number of complimentary orders K required to complete the trade order based on a notional size N for the trade order, wherein K≥1;
   compute values for each option in a strip of K options using an option pricing formula, wherein each of the K options has a different tenor, and wherein respective tenors for each of the K options in the strip correspond to expected waiting times for each of the number of complimentary orders K required to fill the trade order; and
   compute the transaction cost metric based on the computed values for each option in the strip of K options.

21. The computer readable medium of claim 20, wherein the transaction cost metric is referenced to a mid-price for the financial product at trade order inception.

22. The computer readable medium of claim 20, wherein computing the transaction cost metric comprises computing the transaction cost metric as an average of the computed values for each option in the strip of K options.

23. The computer readable medium of claim 20, having further stored thereon instructions that when executed cause the processor to compute the tenors for each option in the strip of K options.

24. The computer readable medium of claim 23, wherein computing the tenors for each option in the strip of K options comprises, for each k, where k=1, 2, . . . , K, dividing k by an average rate of order arrival per unit time to determine the tenor for the kth option in the strip of K options comprises.

25. The computer readable medium of claim 20, wherein the option pricing formula uses a strike price and a spot price, and wherein, for each of the K options, the strike price is an inside price for the financial product at order inception.

26. The computer readable medium of claim 25, wherein the spot price is a mid-price for the financial product at order inception.

27. The computer readable medium of claim 26, having further stored thereon instructions that when executed cause the processor to compute a volatility for the financial product, wherein the computed volatility is used in the option pricing formula to compute the values for the options in the strip.

* * * * *